US009336205B2

(12) United States Patent
Moilanen et al.

(10) Patent No.: US 9,336,205 B2
(45) Date of Patent: May 10, 2016

(54) SYSTEM AND METHOD FOR ANALYSING NATURAL LANGUAGE

(71) Applicant: Theysay Limited, London (GB)

(72) Inventors: Karo-Henri Moilanen, London (GB); Stephen Guy Pulman, Oxford (GB)

(73) Assignee: Theysay Limited, London (GB)

( * ) Notice: Subject to any disclaimer, the term of this patent is extended or adjusted under 35 U.S.C. 154(b) by 444 days.

(21) Appl. No.: 13/860,021

(22) Filed: Apr. 10, 2013

(65) Prior Publication Data
US 2013/0268262 A1 Oct. 10, 2013

Related U.S. Application Data

(60) Provisional application No. 61/622,346, filed on Apr. 10, 2012.

(51) Int. Cl.
G06F 17/20 (2006.01)
G06F 17/28 (2006.01)
G06F 17/27 (2006.01)

(52) U.S. Cl.
CPC .............. *G06F 17/28* (2013.01); *G06F 17/271* (2013.01); *G06F 17/2785* (2013.01)

(58) Field of Classification Search
CPC ......... G06F 17/20; G06F 17/21; G06F 17/27; G06F 17/28; G06F 17/30; G06F 17/271; G06F 17/2765
USPC .............................................. 704/9; 715/256
See application file for complete search history.

(56) References Cited

U.S. PATENT DOCUMENTS

| 7,424,420 | B2 * | 9/2008 | Polanyi et al. ..................... 704/8 |
| 7,788,086 | B2 * | 8/2010 | Corston-Oliver et al. ........ 704/9 |
| 7,996,210 | B2 * | 8/2011 | Godbole et al. ................... 704/9 |
| 8,200,477 | B2 * | 6/2012 | Yi et al. ............................ 704/9 |
| 8,239,189 | B2 * | 8/2012 | Skubacz et al. ................... 704/9 |
| 2008/0249764 | A1 * | 10/2008 | Huang et al. ...................... 704/9 |
| 2009/0193328 | A1 * | 7/2009 | Reis et al. ..................... 715/231 |
| 2010/0145940 | A1 * | 6/2010 | Chen et al. .................... 707/736 |
| 2011/0161071 | A1 * | 6/2011 | Duong-Van ....................... 704/9 |
| 2012/0101805 | A1 * | 4/2012 | Barbosa et al. ................... 704/9 |
| 2012/0166180 | A1 * | 6/2012 | Au .................................... 704/9 |
| 2012/0278064 | A1 * | 11/2012 | Leary et al. ....................... 704/9 |
| 2013/0173254 | A1 * | 7/2013 | Alemi ............................... 704/9 |

OTHER PUBLICATIONS

Silva, Mário J., et al. "Automatic expansion of a social judgment lexicon for sentiment analysis." (2010).*
Andreevskaia, A. et al., "Semantic Tag Extraction from WordNet Glosses," Proceedings of the LRCE-2006, 2006, pp. 413-416.

(Continued)

*Primary Examiner* — Paras D Shah
(74) *Attorney, Agent, or Firm* — Fenwick & West LLP

(57) ABSTRACT

A computer implemented method for analyzing natural language to determine a sentiment between two entities discussed in the natural language, comprising the following steps: receiving the natural language at a processing circuitry; analyzing the natural language to determine a syntactic representation which shows syntactic constituents of the analyzed natural language and to determine a sentiment score of each constituent; determining which constituents link the two entities; and calculating an overall sentiment score for the sentiment between the two entities by processing the sentiment score of each constituent of the constituents determined to link the two entities.

15 Claims, 8 Drawing Sheets

(56) References Cited

OTHER PUBLICATIONS

Hu, M. et al., "Mining and Summarizing Customer Reviews," KDD '04, ACM, Aug. 22-25, 2004, 10 pages.

Kim, S-M. et al., "Determining the Sentiment of Opinions," Proceedings of the COLING Conference, Geneva, 2004, 8 pages.

Niu, Y. et al., "Analysis of Polarity Information in Medical Text," AMIA Annual Symposium Proceedings Archive, 2005, pp. 570-574.

Polanyi, L. et al., "Contextual Valence Shifters," Computing Attitude and Affect in Text: Theory and Applications, The Information Retrieval Series, Springer, 2006, 6 pages, vol. 20.

Strapparava, C. et al., "SemEval-2007 Task 14: Affective Text," SemEval '07 Proceedings of the $4^{th}$ International Workshop on Semantic Evaluations, 2007, 5 pages.

Whitelaw, C. et al., "Using Appraisal Taxonomies for Sentiment Analysis," CIKM '05 Proceedings of the $14^{th}$ ACM International Conference on Information and Knowledge Management, 2005, 5 pages.

Wilson, T. et al., "Recognizing Contextual Polarity in Phrase-Level Sentiment Analysis," HLT '05 Proceedings of the Conference on Human Language Technology and Empirical Methods in Natural Language Processing, 2005, 8 pages.

Yu, H. et al., "Towards Answering Opinion Questions: Separating Facts from Opinions and Identifying the Polarity of Opinion Sentences," EMNLP '03 Proceedings of the 2003 Conference on Empirical Methods in Natural Language Processing, 2003, 8 pages.

Dowty, D.R. et al., Introduction to Montague Semantics, Kluwer Academic Publishers, 1981, 326 pages.

Gryc, W. et al., "Leveraging Textual Sentiment Analysis with Social Network Modelling: Sentiment Analysis of Political Blogs in the 2008 U.S. Presidential Election," T2PP Workshop, Vrije Universität Amsterdam, Apr. 9-10, 2010, pp. 1-14.

Moilanen, K. et al., "The Good, the Bad, and the Unknown: Morphosyllabic Sentiment Tagging of Unseen Words," Proceedings of the $46^{th}$ Annual Meeting of the Association for Computational Linguistics on Human Language Technologies, 2008, 4 pages.

Moilanen, K. et al., "Multi-Entity Sentiment Scoring," International Conference RANLP 2009, Borovets, Bulgaria, 2009, 6 pages.

Moilanen, K. et al., "Packed Feelings and Ordered Sentiments: Sentiment Parsing with Quasi-Compositional Polarity Sequencing and Compression," Proceedings of the 1st Workshop on Computational Approaches to Subjectivity and Sentiment Analysis (WASSA 2010), 2010, 8 pages.

Moilanen, K. et al., "Sentiment Composition," Proceedings of Recent Advances in Natural Language Processing (RANLP 2007), Sep. 27-29, 2007, Borovets, Bulgaria, 5 pages.

\* cited by examiner

| Type | (Sub)context | | |
|---|---|---|---|
| 1: ATOMIC | / | [  ] |  $]^{(+)}$ |
| 2: INTERMEDIATE | / | [ credit ] | *crunch*$]^{(-)}$ |
| 3: INTERMEDIATE | / | [ credit ] | *crunch rescue*$]^{(+)}$ |
| 4: INTERMEDIATE | / | [ credit ] | *crunch rescue package*$]^{(+)}$ |
| 5: INTERMEDIATE | *[ opposes* | [ credit ] | *crunch rescue package*$]^{(-)}$ |
| 6: GLOBAL | *[EU opposes* | [ credit ] | *crunch rescue package*$]^{(-)}$ |

Key

▨ Positive

▨ Negative

Figure 3: Multi-entity sentiment scores

SYSTEM AND METHOD FOR ANALYSING NATURAL LANGUAGE

FIELD OF INVENTION

The present invention relates to the analysis, typically the automatic analysis, of natural language. In particular, but not exclusively, embodiments relate to the determination of the sentiment between two entities mentioned with the natural language. Further, and again not exclusively, embodiments may relate to the determination of the confidence of analysis determining the sentiment. Yet further, and again not exclusively, embodiments may relate to determining the sentiment of an entity within a portion of natural language.

BACKGROUND OF INVENTION

Using lists of positive and negative keywords can give the beginnings of a sentiment classification system. However, classifying sentiment on the basis of individual words can give misleading results because atomic sentiment carriers can be modified (weakened, strengthened, or reversed) based on lexical, discoursal, or paralinguistic contextual operators. The skilled person will appreciate that, in a portion of natural language, an atomic sentiment carrier (or an atomic (sub) context) is a constituent of that natural language that cannot be analysed any further for sentiment.

Past attempts to deal with this phenomenon include writing heuristic rules to look out for negatives and other 'changing' words, combining the scores of individual positive and negative word frequencies, and training a classifier on a set of contextual features. While statistical sentiment classifiers work well with a sufficiently large input (e.g. a 750-word movie review), smaller subsentential text units such as individual clauses or noun phrases pose a challenge. It is such low-level units that are needed for accurate entity-level sentiment analysis to assign (local) polarities to individual mentions of people, for example.

Known systems are described in documents such as US2009/0077069. However, such systems tend to be based upon fixed frames, templates or the like into which words and syntactic structures must be allocated in order for the analysis to progress. As such, these limited systems are not as flexible or as useful as may be desired.

The ability to detect author sentiment towards various entities in text is a goal in sentiment analysis, and has many applications. Entities, which can comprise anything from mentions of people or organisations to concrete or even abstract objects, condition what a text is ultimately about. Besides the intrinsic value of entity scoring, the success of document- and sentence-level analysis is also decided by how accurately entities in them can be modelled. Deep entity analysis presents the most difficult challenges, be they linguistic or computational. One of the most recent developments in the area—compositional semantics—has shown potential for sentence- and expression-level analysis in both logic-oriented and machine learning-oriented paradigms.

Entity-level approaches have so far involved relatively shallow methods which presuppose some pre-given topic or entity of relevance to be classified or scored. Other proposals have attempted specific semantic sentiment roles such as evident sentiment HOLDERs, SOURCEs, TARGETs, or EXPERIENCERs. What characterises these approaches is that only a few specific entities in text are analysed while all others are left unanalysed. While shallow approaches can capture some amount of explicitly expressed sentiment, they ignore all layers of implicit sentiment pertaining to a multitude of other entities.

One prior art paper discussing an example of deep level multi sentiment analysis is: Karo Moilanen and Stephen Pulman. (2009). *Multi-entity Sentiment Scoring*. In Proceedings of Recent Advances in Natural LANGUAGE Processing (RANLP 2009). September 14-16, Borovets, Bulgaria. pp. 258-263.

SUMMARY OF INVENTION

According to first aspect of the invention there is provided a computerised method of analysing natural language to determine a sentiment between two entities discussed in the natural language, comprising one or more of the following steps:
1. receiving the natural language at a processing circuitry;
2. analysing the natural language to determine a syntactic representation which shows the syntactic constituents of the analysed natural language together with determining a sentiment score of each constituent;
3. determining which constituents link the two entities; and
4. calculating an overall sentiment score for the sentiment between the two entities by processing the sentiment score of each constituent of the constituents determined to link the two entities.

Some embodiments may be arranged to output the overall sentiment score for the sentiment between the two entities.

Some embodiments may be arranged to take a plurality of documents, which may be web page content or the like, and analyse the content provided by the documents as natural language.

According to a second aspect of the invention there is provided a machine readable data carrier which when read by a machine cause that machine to process natural language, such as in the form of written text, wherein the machine may then perform any of the following:
1. analysing the natural language to determine a syntactic representation which shows the syntactic constituents of the analysed natural language together with determining a sentiment score of each constituent;
2. determining which constituents link the two entities; and
3. calculating an overall sentiment score for the sentiment between the two entities by processing the sentiment score of each constituent of the constituents determined to link the two entities.

According to a third aspect of the invention there is provided a processing apparatus arranged to provide the method of the first aspect of the invention.

According to a fourth aspect there is provided a computerised method of analysing natural language to determine a sentiment and generating a confidence score which gives a measure of the belief in the determined sentiment, comprising the following steps:
1. receiving the natural language at a processing circuitry;
2. using one or more metrics to assess the natural language; and
3. outputting a score based upon the metrics used to assess the natural language representative of the confidence of which an assessment of the sentiment of the natural language can be made.

According to a fifth aspect of the invention there is provided a machine readable medium containing instructions which when by a machine cause that machine to determine a sentiment and generate a confidence score which gives a measure of the belief in the determined sentiment, wherein the programmed machine may perform any of the following:
1. receiving the natural language at a processing circuitry;
2. using one or more metrics to assess the natural language; and
3. outputting a score based upon the metrics used to assess the natural language representative of the confidence of which an assessment of the sentiment of the natural language can be made.

According to a sixth aspect of the invention there is provided a processing apparatus arranged to provide the method of the fourth aspect of the invention.

According to a seventh aspect of the invention there is provided a computerised method of analysing natural language to determine an overall sentiment for the natural language being analysed, the method comprising at least one of the following steps:
1. receiving the natural language at a processing circuitry;
2. analyse the natural language to determine a syntactic representation which shows the syntactic constituents of the analysed natural language;
3. determining as the syntactic representation is generated a constituent score for each constituent; and
4. processing the constituent scores such that once the syntactic representation has been completed an overall sentiment score for the natural language being analysed has been determined.

According to an eighth aspect of the invention there is provided a machine readable medium containing instructions which when read by a machine cause that machine to determine an overall sentiment for a portion of natural language, wherein the instructions cause the machine to:
1. receive the natural language at a processing circuitry;
2. analyse the natural language to determine a syntactic representation which shows the syntactic constituents of the analysed natural language;
3. determine as the syntactic representation is generated a constituent score for each constituent; and
4. process the constituent scores such that once the syntactic representation has been completed an overall sentiment score for the natural language being analysed has been determined.

According to a ninth aspect of the invention there is provided a processing apparatus arranged to provide the method of the seventh aspect of the invention.

The machine readable medium (which may be thought of as a computer readable medium) of any of the aspects of the invention may comprise any one or more of the following: a floppy disk, a CDROM, a DVD ROM/RAM (including +RW, -RW), an HD DVD, a BLU Ray disc, a hard drive, a non-volatile memory, any form of magneto optical disk, a wire, a transmitted signal (which may comprise an internet download, an ftp transfer, or the like), or any other form of computer readable medium.

The skilled person will appreciate that a feature described in relation to any one of the above aspects of the invention may be applied, mutatis mutandis, to any other aspects of the invention.

BRIEF DESCRIPTION OF THE DRAWINGS

There now follows by way of example only a detailed description of an embodiment of the present invention with reference to the accompanying drawings in which.

DETAILED DESCRIPTION OF THE DRAWINGS

Figure 1:
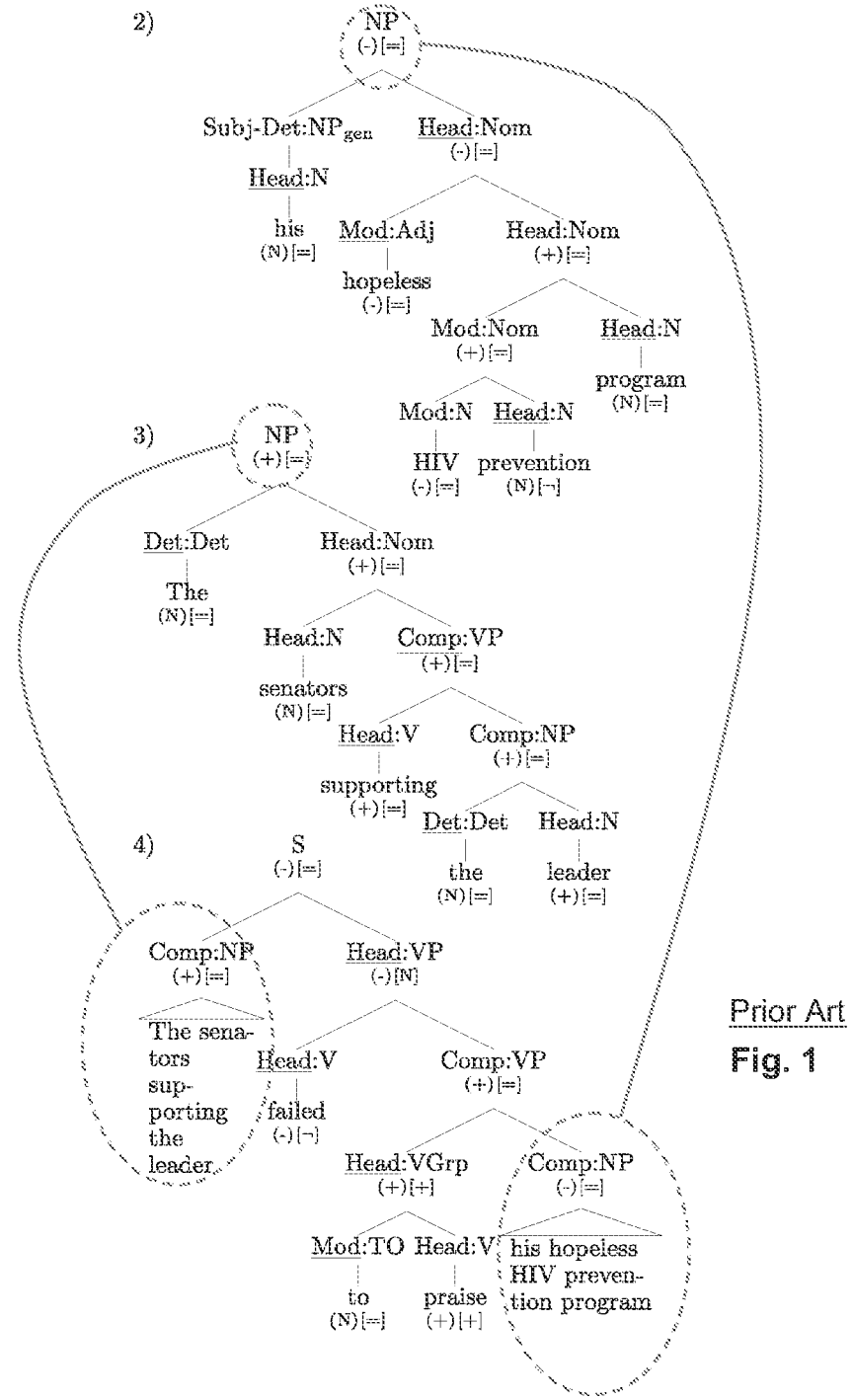
FIG. 1 (Prior Art) shows a tree outlining a prior art method of determining the overall sentiment of a portion of natural language.

The description of FIG. 1 below, describes a recursive sentiment parsing process and is based upon the paper "Sentiment Composition" by Karo Moilanen and Stephen Pulman; Proceedings of Recent Advances in Natural Language Processing (RANLP 2009) September 14-16, Borovets, Bulgaria, PP 258-263. The contents of this paper are hereby incorporated by reference.

The references referred to in that paper are reproduced in the reference list below.

If the meaning of a sentence is a function of the meanings of its parts then the global polarity of a sentence is a function of the polarities of its parts. For example, production rules such as [VP$\alpha$→V$\alpha$+NP] and [S$\beta$→NP+VP$\beta$] operating on a structure like "America invaded Iraq" would treat the verb "invade" as a function from the NP (Noun Phrase) meaning to the VP (Verb Phrase) meaning (i.e. as combining semantically with its direct object to form a VP). The VP meaning is correspondingly a function from the NP meaning to the S meaning (i.e. as combining with a subject to form a sentence). Analogously, a 'DECREASE' verb like "reduce" (cf. [1]) should then be analysed as having a compositional sentiment property such that it reverses the polarity ($\alpha$) of its object NP in forming the VP, hence [VP($\neg \alpha$)→$\beta$V$\beta$[DECREASE]+NP ($\alpha$)]. Thus the positive polarity in "reduce the risk" even though "risk" is negative in itself (cf. the negative polarity in "reduce productivity"). In fact, this semi-compositionality also holds at other linguistic levels: certainly amongst morphemes, and arguably also at suprasentential levels. Grounded on the descriptive grammatical framework by ([4]), a theoretical frame-work is proposed within which the sentiment of such structures can be calculated.

The proposed sentiment composition model combines two input (IN) constituents at a time (IN1 and IN2) and calculates a global polarity for the resultant composite output (OUT) constituent (cf. parent node dominance in the modifies polarity and modified by polarity structural features in ([10])). The two IN constituents can be of any syntactic type or size. The model assumes dominance of non-neutral (positive (+), negative (−), mixed (M)) sentiment polarity over neutral (N) polarity. The term sentiment propagation is used here to denote compositions in which the polarity of a neutral constituent is overridden by that of a non-neutral constituent:

$$(\{(+)(N)\} \to (+); \{(-)(N)\} \to (-)).$$

The term polarity reversal is used to denote compositions in which a non-neutral polarity value is changed to another non-neutral polarity value ((+)→(−); (−)→(+)) (cf. [7]), and the term polarity conflict to denote compositions containing conflicting non-neutral polarities ({(+)(−)}→(M)). Polarity conflict resolution refers to disambiguating compositions involving a polarity conflict ((M)→(+); (M)→(−)).

Polarity conflict resolution is achieved by ranking the IN constituents on the basis of relative weights assigned to them dictating which constituent is more important with respect to sentiment. The stronger of the IN constituents is here denoted as SPR (superordinate) whereas the label SUB (subordinate) refers to the dominated constituent (i.e. SPR>>SUB). Except for (N)[=] SPR constituents, it is therefore the SPR constituent and the compositional processes executed by it that determine the polarity ($\alpha$) of the OUT constituent (i.e. OUT$\alpha$ij→SPR$\alpha$i+SUB$\alpha$j). The weights are not properties of individual IN constituents per se but are latent in specific syntactic constructions such as [Mod:Adj Head:N] (e.g. adjectival premodification of head nouns) or [Head:V Comp: NP] (e.g. direct object complements of verbs).

Each entry in a sentiment lexica used by the system (across all word classes) is tagged and each constituent with one of the following tags: default ([=]), positive ([+]), negative ([−]), and reverse ([¬]). These tags allow us to specify at any structural level and composition stage what any given SPR constituent does locally to the polarity of an accompanying SUB constituent with-out fixed-order windows of n tokens (cf. ([7]), modification features in ([10]), change phrases in ([6])). A [=] SPR constituent combines with a SUB constituent in the default fashion. The majority of constituents are [=]. A [¬] SPR constituent reverses the polarity of the SUB constituent and assigns that polarity to the OUT constituent (cf. general polarity shifters in ([10])). As SPR constituents, some carriers such as "[contaminate](−)" or "[soothe](+)" exhibit such strong sentiment that they can determine the OUT polarity irrespective of the SUB polarity—consider the static negativity in "[contaminated that damn disk](−)", "[contaminated the environment](−)", and "[contaminated our precious water](−)" (vice versa for some positive carriers). Hence the [−] and [+] constants which can furthermore be used as polarity heuristics for carriers occurring prototypically with a specific polarity (e.g. "[deficiency (of sth positive)](−)") (cf. pre-suppositional items in ([7]), negative and positive polarity shifters in ([10])).

Notice that the SPR constituent operates on the SUB constituent irrespective of the polarity of the latter as a [¬] SPR constituent such as the determiner "[less](N)[¬]" reverses both (+) and (−) SUB constituents (e.g. "[less tidy](−)", "[less ugly](+)"), for example. However, cases in which SPR operations are required only in conjunction with a specific SUB constituent polarity do exist. The reversal potential in the degree modifier "[too](N)[¬]", for instance, seems to operate only alongside (+) SUB constituents (i.e. "[too colourful](−)" vs. "??[too sad](+)"). The adjective "[effective](+)[=]" operates similarly only with (+) or (N) SUB constituents (i.e. "[effective remedies/diagrams](+)" vs. "[effective torture](−)"). It is thus proposed that (?:+) and (?:−) be used as further filters to block specific SPR polarities as required by individual carriers.

To illustrate how the composition model operates, consider the sample sentence in Example 1:

1) The senators supporting(+) the leader(+) failed(−) to praise(+) his hopeless(−) HIV(−) prevention program.

Raw frequency counts, yielding three (+) and three (−) carriers, would fail to predict the global negative polarity in the sentence. Embodiment of the invention represent the sentence as shown in FIG. 1 at (2), with the analysis starting with the direct object NP of the predicator "[praise]$^{(+)[+]}$; i.e. praise is the root of the tree shown in FIG. 1.

Through polarity reversal, the internal sentiment in "[HIV prevention]$^{(+)[=]}$" is first arrived at due to the [¬] status of the SPR head noun "[prevention]$^{(N)[¬]}$" which reverses the (−) premodifying noun "[HIV]$^{(−)[−]}$". The (N) head noun "[program]$^{(N)[−]}$" is then overridden by the (+) pre-modifying nominal "[HIV prevention]$^{(+)[−]}$". When the resultant nominal is combined with the premodifying attributive SPR input "[hopeless]$^{(−)[−]}$", the en-suing polarity conflict can be resolved through the dominance of the premodifier in this syntactic situation. The final combination with the SUB subject determiner "[his]$^{(N)[−]}$" is a case of propagation as the resultant NP reflects the polarity of the head nominal. Sentiment propagation can be seen throughout the subject NP, shown in FIG. 1 at (3) as the (+) head noun "[leaderr]$^{(+)[=]}$", combined with a (N) SPR determiner, results in a (+) NP ("[the leader]$^{(+)[=]}$"). When that NP is combined with a (+) SPR head participial, a (+) SPR VP is generated ("[supporting the leader]$^{(+)[=]}$") which in turn overrides the (N) head noun "[senators]$^{(N)[=]}$". The final (N) SPR determiner does not change the polarity any further.

The NPs thus resolved can then be combined with the two predicators to form a sentence as shown in FIG. 1 at (4). The direct object NP "[his hopeless HIV prevention program]$^{(−)[=]}$" is reversed when it is combined with an SPR verb group outputting constant positivity ("[to praise]$^{(+)[+]}$"). When the resultant (+) VP is used as the complement of a [¬] SPR head verb polarity reversal occurs once again yielding a (−) VP ("[failed to praise his hopeless HIV prevention program]$^{(−)[−]}$"). Lastly, the (+) subject NP combines with the (−) predicate, and the polarity conflict is resolved due to the predicate being the SPR constituent. Hence the global negative sentiment for the present sample sentence can be calculated from its sub-constituents.

Within a syntactic phrase, the polarity of the phrasal head can be changed by its pre- and post-modifying dependents. In general, pre-head dependents dominate their heads. Determiners (e.g. "[no crime]$^{(−)}$") and DPs (e.g. "[too much wealth]$^{(−)}$") can be modeled as [Det:(Det|DP)>>Head:N] ([4]: 354-99, 431-2, 549, 573). Attributive pre-head AdjPs and simple pre-head ING/EN Participials are ranked similarly as [Mod:(AdjP|V)>>Head:N] to account for polarity reversals (e.g. "[trivial problem]$^{(+)}$"), conflicts (e.g. "[nasty smile](−)[=]"), and seemingly contradictory compositions with (?:−) premodifiers (e.g. "[perfected torture]$^{(−)}$"). However, mixed sentiment is possible in this construction (e.g. "[savvy liar](M)") ([4]: 444). Embodiments rank attributive pre-head Adverbs as [Mod:Adv>>Head:(Adj|Adv)] (e.g. "[decreasingly happy]$^{(−)}$", "[never graceful (ly)]$^{(−)}$" although they too can lead to unresolvable mixed sentiment (e.g. "[impressively bad(ly)]$^{(M)}$") (idem. 548, 572-3, 582-5). The pre-head Negator (Neg) "not", which is stronger than its head in NPs (e.g. "[not a scar]$^{(+)}$"), AdjPs, AdvPs, and PPs, is ranked as [Mod:Neg>>Head:(N|Adj|Adv|P)] (cf. [7]). In contrast, pre-head Nouns and Nominals in NPs are secondary ([Head:N>>Mod:(N|Nom)]) as seen in polarity conflicts (e.g. "[family benefit fraud]$^{(−)}$", "[abuse helpline]$^{(+)}$") and [¬] head nouns (e.g. "[risk minimisation]$^{(+)}$") (idem. 444, 448-9). The genitive subject determiner with the clitic's appears similarly weaker than its head noun or nominal ([Head:(N|Nom)>>Subj-Det:NPgen]) (e.g. "[the war's end]$^{(+)}$", although polarity conflicts can lead to exceptions: compare "[the offender's apology]$^{(+)}$" with "[the rapist's smile]$^{(−)}$" (idem. 467-83).

Post-head dependents' weights are more variable. In NPs, post-head AdjPs generally dominate (e.g. "[my best friend angry at me]$^{(-)}$") as [Comp:AdjP>>Head:N] (idem. 445). Post-head Participials dominate their head nouns as [Comp: VP>>Head:N] (e.g. "[ugly kids smiling]$^{(+)}$", "[the cysts removed]$^{(+)}$") (idem. 446), but post-head VPs are dominated by their head prepositions ([Head:P>>Comp:VP]) (e.g. "[against helping her]$^{(-)}$") ([4]: 641). Post-head PPs are likewise dominated by their noun, adjective, or adverb heads. The rankings [Head:(N|Adj|Adv)>>Comp:PP] are thus proposed (e.g. "[different(ly) from those losers]$^{(+)}$", "[unhappy with success]$^{(-)}$", "[the end of the war]$^{(+)}$") ([4]: 446, 543-6). However, exceptions may surface in these constructions, especially in NPs: compare "[two morons amongst my friends]$^{(-)}$" with "[cute kittens near a vicious python]$^{(-)}$".

Moreover, mixed sentiment may surface (e.g. "[angry protesters against the war]$^{(M)}$"). Lastly, embodiments may rank post-head NPs in PPs as [Head:P>>Comp:NP] (e.g. "[against racism]$^{(+)}$", "[with pleasure]$^{(+)}$") (idem. 635).

In clausal analysis, the embodiment being described treats as the clausal head the predicator (P) which is made of one verb group and compulsory (C)omplements and optional (A)djuncts. The predicator is generally stronger than its complements. Internal complements are proposed (Direct Object (OD), Indirect Object (OI), Subject Predicative Complement (PCS), Object Predicative Complement (PCO), and Oblique (C)omplement) which may be combined with the predicator before combining the resultant predicate with the predicator's external complements ([4]: 215-8; 236-57). In Monotransitive Predicates (P-OD), the ranking [Head: P>>Comp:OD] models propagation (e.g. "[failed it]$^{(-)}$"), polarity conflicts (e.g. "[spoiled the party]$^{(-)}$"), and [¬] predicators (e.g. "[prevent the war]$^{(+)}$") (idem. 244-8). Ditransitive Predicates (P-OI-OD), (P-OD-C) behave in a similar way. Since the monotransitive "[sent junk]$^{(-)}$", pure ditransitive "[sent me junk]$^{(-)}$", and oblique ditransitive "[sent junk to me]$^{(-)}$" all share a [−] P-OD core, this is resolved first before adding an OI or C to model propagation (e.g. "[baked a yummy cake for me]$^{(+)}$"), and polarity conflicts (e.g. "[brought my friend sad news]$^{(-)}$") (idem. 244-8). Through the ranking [Head:P>>Comp:PCS], typically (N) copular verbs in Complex Intransitive Predicates (P-PCS) can be explained (e.g. "[seems nice]$^{(+)}$") (idem. 251-72). Complex Transitive Predicates (P-OD-PCO) resemble P-PCS predicates in that the additional direct object does not generally affect the P-PCS core (e.g. "[consider (the winner/it/the poison) ideal]$^{(+)}$"). Hence the ranking [Head:P-PCO>>Comp:OD] (ibidem). (S)ubjects are ranked as [Head: P>>Comp:S] (e.g. "[love can hurt]$^{(-)}$", "[the misery ended]$^{(+)}$") (idem. 235-43).

Note that [¬] NP complements constitute an exception calling for reverse rankings–consider "[nobody died]$^{(+)}$", "[killed nobody]$^{(+)}$", for example. Hence the rankings [Comp:(OD[¬]|S[¬])>>Head:P] for these special cases. Adjuncts are generally stronger than predicators and predicates. The ranking [Comp:AdvP>>Head:P] for AdvP Adjuncts, for example, supports propagation (e.g. "[he moved it gently]$^{(+)}$"), and polarity conflicts (e.g. "[greeted him insincerely]$^{(-)}$") (idem. 224-5, 575, 669, 779-84).

These and other sample rankings are summarised in Table 1.

TABLE 1

Sample Construction Rankings

| Pre-head | | | Post-head | |
|---|---|---|---|---|
| PHRASES | | | | |
| (Det: (Det|DP)|Subj-Det: NP$_{gen}$$^{[¬]}$|Mod: (Neg|AdjP|V)) | >> | Head: N | Head: (N|Nom) | << Comp: (AdjP|VP) |
| (Det: (Det|DP)|Mod: (Neg|PP|AdvP)) | >> | Head: Adj | Head: Adj | >> Comp: PP |
| (Det: (Det|DP)|Mod: (Neg|Adv)) | >> | Head: Adv | Head: Adv | >> Comp: PP |
| Mod: (Neg|AdvP|NP) | >> | Head: P | Head: P | >> Comp: (NP|VP) |
| (Subj-Det: NP$_{gen}$|Mod: (N|Nom)) | << | Head: N | Head: N | >> Comp: (NP|PP) |
| CLAUSES | | | | |
| (Comp: (PC$^S$|S$^{[¬]}$|O$^{D[¬]}$|O$^{I[¬]}$)|A: (AdvP|AdjP|PP)|Mod: Neg) | >> | Head: P | Head: P | >> Comp: (S|O$^D$) |
| Comp: O$^D$ | << | Head: P-PC$^O$ | Head: P-O$^D$ | >> Comp: (O$^I$|O$^C$) |

The proposed model was implemented as a lexical parsing post-process interpreting the output of a syntactic dependency parser. Some embodiments employ a sentiment lexicon containing sentiment words with prior polarities and may be other compositional features. Adhering to the proposed compositional processes and constituent rankings at each stage of the analysis, dependency links and morphosyntactic information (e.g. word class, syntactic role, (pre-/post-)head status) are first used to construct individual syntactic phrases (NPs, VPs, AdjPs, AdvPs) and to calculate their internal polarities (phrasal sentiment) through stepwise chunking rules which find the rightmost subconstituent in a given phrase and expand it leftwards until a phrasal boundary is hit (see FIG. 1 (2) and (3)). To calculate clausal and sentential sentiment, the obtained phrasal constituents are then combined (see FIG. 1 (4)).

Thus, it is shown that sentiment exhibits quasi-compositionality in noticeably many areas, and that it is possible to approach sentiment propagation, polarity reversal, and polarity conflict resolution within different linguistic constituent types at different grammatical levels in an analytically and computationally uniform manner by relying on traditional compositional semantics and deep parsing.

[1] A. Andreevskaia and S. Bergler. Semantic tag extraction using wordnet glosses. In Proceedings of LREC 2006, Genoa, 2006.

[2] D. Dowty, R. Wolf, and S. Peters. Introduction to Montague Semantics. D. Reidel, Dordrecht, 1981.

[3] M. Hu and B. Liu. Mining and summarizing customer reviews. In Proceedings of the ACM SIGKDD International Conference on Knowledge Discovery & Data Mining (KDD-2004), Seattle, 2004.
[4] R. Huddleston and G. K. Pullum. The Cambridge Grammar of the English Language. Cambridge Uni-versity Press, Cambridge, 2002.
[5] S.-M. Kim and E. Hovy. Determining the sentiment of opinions. In Proceedings of COLING 2004, Geneva, 2004.
[6] Y. Niu, X. Zhu, J. Li, and G. Hirst. Analysis of polarity information in medical text. In Proceedings of the American Medical Informatics Association 2005 Annual Symposium (AMIA 2005), Washington D.C., 2005.
[7] L. Polanyi and A. Zaenen. Contextual lexical valence shifters. In Y. Qu, J. Shanahan, and J. Wiebe, editors, Exploring Attitude and Affect in Text: Theories and Applications: Papers from the 2004 Spring Symposium, Technical Report SS-04-07. AAAI, 2004.
[8] C. Strapparava and R. Mihalcea. Semeval-2007 task 14: Affective text. In Proceedings of SemEval 2007, Prague, 2007.
[9] C. Whitelaw, N. Garg, and S. Argamon. Using appraisal taxonomies for sentiment analysis. In Proceedings of the 2005 ACM CIKM International Conference on Information and Knowledge Management, Bremen, 2005.
[10] T. Wilson, J. Wiebe, and P. Hoffmann. Recognizing contextual polarity in phrase-level sentiment analysis. In Proceedings of HLT/EMNLP 2005, Vancouver, 2005.
[11] H. Yu and V. Hatzivassiloglou. Towards answering opinion questions: Separating facts from opinions and identifying the polarity of opinion sentences. In Proceedings of EMNLP 2003, Sapporo, 2003.

Figure 2:
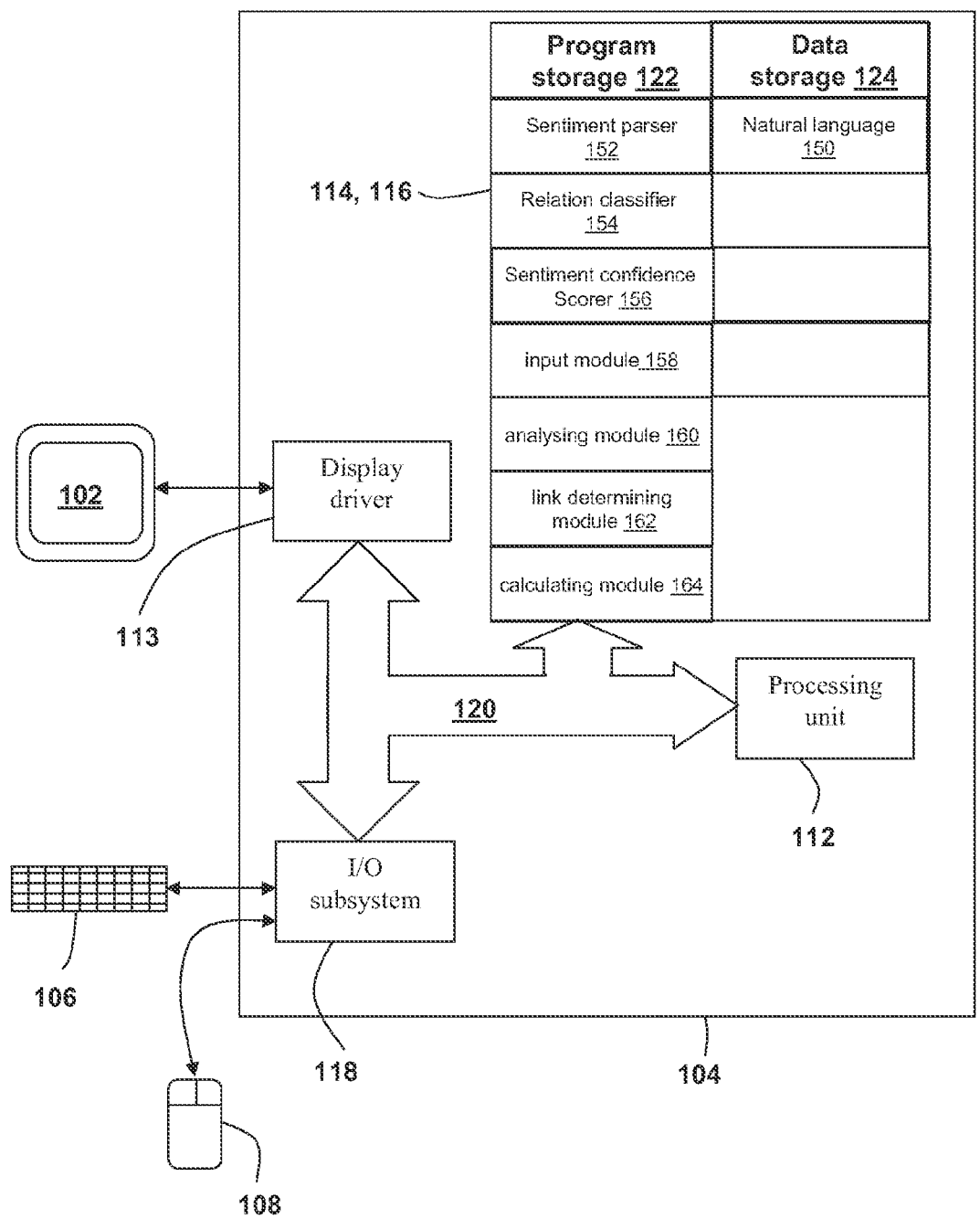
FIG. 2 schematically shows a processing circuitry arranged to provide an embodiment of the invention.

The computer system of FIG. 2 is arranged to implement an embodiment and comprises a display 102, processing circuitry 104, a keyboard 106 and a mouse 108. The processing circuitry 104 comprises a processing unit 112, a graphics system 113, a hard drive 114, a memory 116, an I/O subsystem 118 and a system bus 120. The processing unit 112, graphics system 113 hard drive 114, memory 116 and I/O subsystem 118 communicate with each other via the system bus 120, which in this embodiment is a PCI bus, in a manner well known in the art.

The processing unit 112 may comprise a processor such as an Intel™ i3™, i5™ or i7™ processor or may comprise an AMD™ Bulldozer™ or Bobcat™ processor.

The graphics system 113 comprises a dedicated graphics processor arranged to perform some of the processing of the data that it is desired to display on the display 102. Such graphics systems 113 are well known and increase the performance of the computer system by removing some of the processing required to generate a display from the processing unit 112.

It will be appreciated that although reference is made to a memory 116 it is possible that the memory could be provided by a variety of devices. For example, the memory may be provided by a cache memory, a RAM memory, a local mass storage device such as the hard disk 114, any of these connected to the processing circuitry 104 over a network connection. However, the processing unit 112 can access the memory via the system bus 120 to access program code to instruct it what steps to perform and also to access data to be processed. The processing unit 112 is arranged to process the data as outlined by the program code.

A schematic diagram of the memory 114,116 of the processing circuitry is shown in FIG. 2. It can be seen that the memory comprises a program storage portion 122 dedicated to program storage and a data storage portion 124 dedicated to holding data.

The program storage portion 122 comprises a sentiment parser 152, a relation classifier 154, a sentiment confidence scorer 156, an input module 158, an analysing module 160, a link determining module 162 and a calculating module 164 all of which are described in more detail below.

The processing circuitry is, in most embodiments, arranged to receive a portion of natural language, via the input module 158, which is arranged to be processed by the processing circuitry 104. In this embodiment, the natural language 150 is held within the data storage portion 124 of the memory. In some embodiments, the input module may utilise the I/O subsystem 118 to move the natural language 150 into the data storage portion 124.

Turning to an embodiment, it is helpful to describe this with reference to a portion of natural language, which in this embodiment is a sentence of text. However, in other embodiments, the natural language may comprise a larger or shorter piece of text (such as a plurality of sentences; a paragraph; a chapter, a complete document, or the like), spoken word—perhaps converted to text, or the like. Some embodiments may utilise the analysing module 160 to perform at least some of the following analysis. Indeed, in some embodiments, the sentiment parser 152, the relation classifier 154, the sentiment confidence scorer 156, the link determining module 162 and/or the calculating module 164 (or indeed any other module) may be provided by portions of the analysing module 160.

In the following, it is helpful to understand the following:
[CONSTITUENT]: a structural unit that has a specific syntactic function in a sentence—NP (Noun Phrase), AdjP (Adjective Phrase), AdvP (Adverb Phrase), VP (Verb Phrase), PP (Prepositional Phrase), . . . . Each has one (1) head and optional pre- and post-head dependents.

[SENTIMENT (SUB)CONTEXT]: a syntactic constituent with its own internal/global sentiment properties. In the sentence "My friend has no hope", sentiment (sub)contexts accordingly include:

TABLE (1)

| Sentiment | (sub)context |
|---|---|
| POS | hope |
| NEG | no hope |
| POS | friend |
| POS | my friend |
| NTR | has |
| NEG | has no hope |
| NEG | my friend has no hope |

Here a (sub)context may be thought of as being a constituent as described elsewhere.

[DEPENDENCY]: a syntactic relationship between two words, one being the governor and the other being the dependent. The above phrase "no hope" (NP) can be represented as "hope" being the governor (head) and "no" being its pre-head dependent of the type "determiner".

Figure 7:
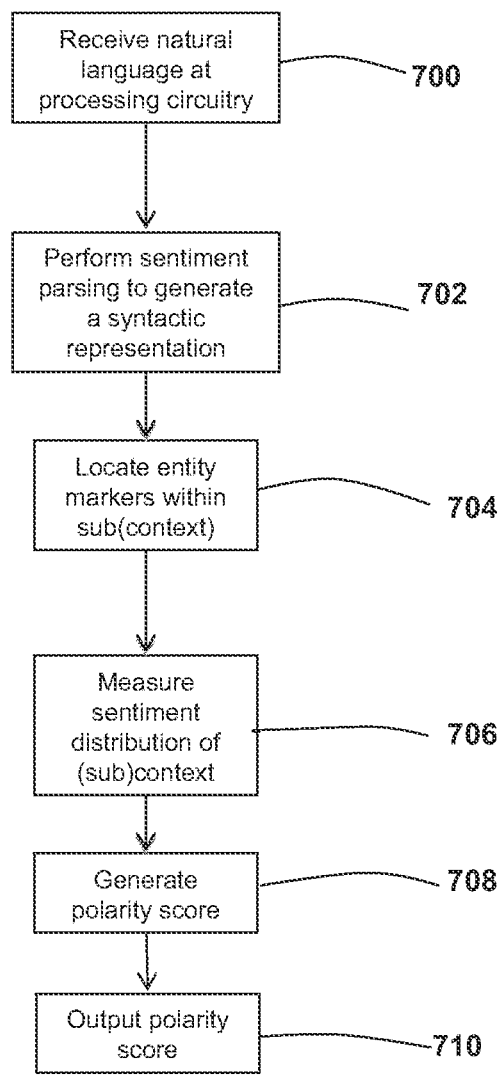
FIG. 7 shows a flowchart outlining the method described in relation to FIGS. 3 and 4.
Figure 8:
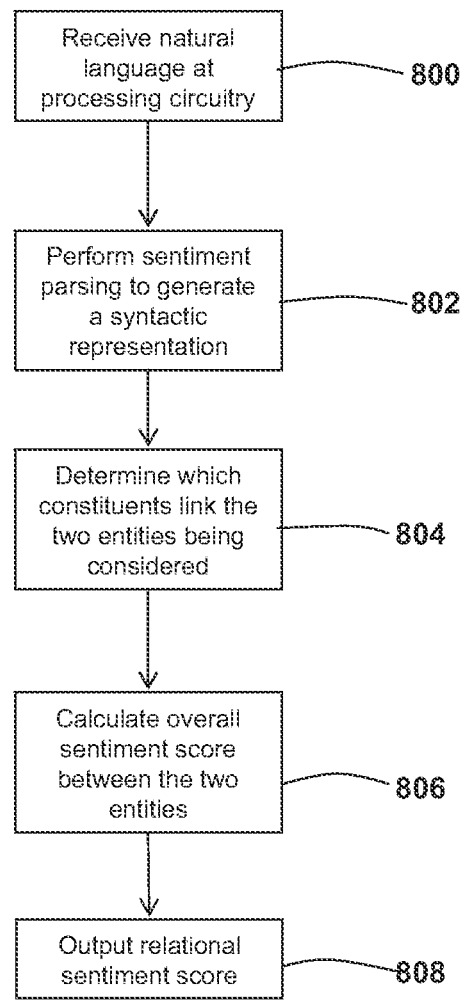
FIG. 8 shows a flowchart outlining the method described in relation to FIGS. 5 and 6.
Figure 9:
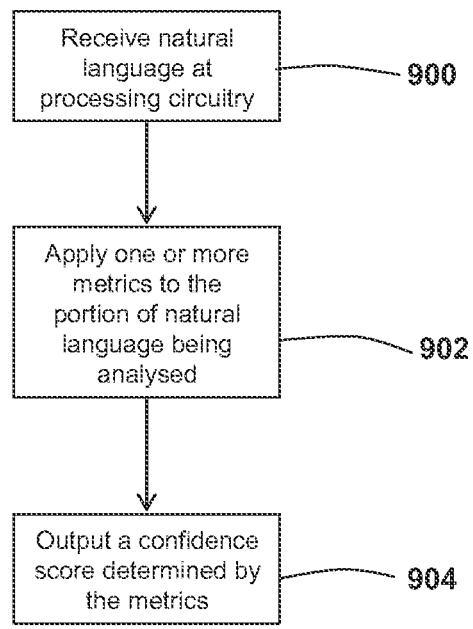
FIG. 9 shows a flowchart outlining a method of determining a confidence score in a sentiment analysis.

The recursive sentiment parsing process described in relation to FIG. 1 and used to provide a syntactic representation provides a basis for various additional levels and types of analysis that can build upon the sentiment parsing described in relation to that Figure. Two such extensions are described below and in relation to FIGS. 3, 4 and 7 so-called multi-entity sentiment analysis is described, and in relation to FIGS. 5, 6 and 8 there is described so-called relational entity analysis.

In the embodiment being described the so-called multi-entity scoring is performed as a post-processor which is run after the main compositional sentiment parsing process and which operates on a full sentiment parse of a sentence after the natural language has been received on a processing circuitry 104 (step 700). As such, the entity scoring is performed after a syntactic representation of the natural language has been generated (box 702 FIG. 7). One such example of a syntactic representation is shown in FIG. 5

Figure 5:
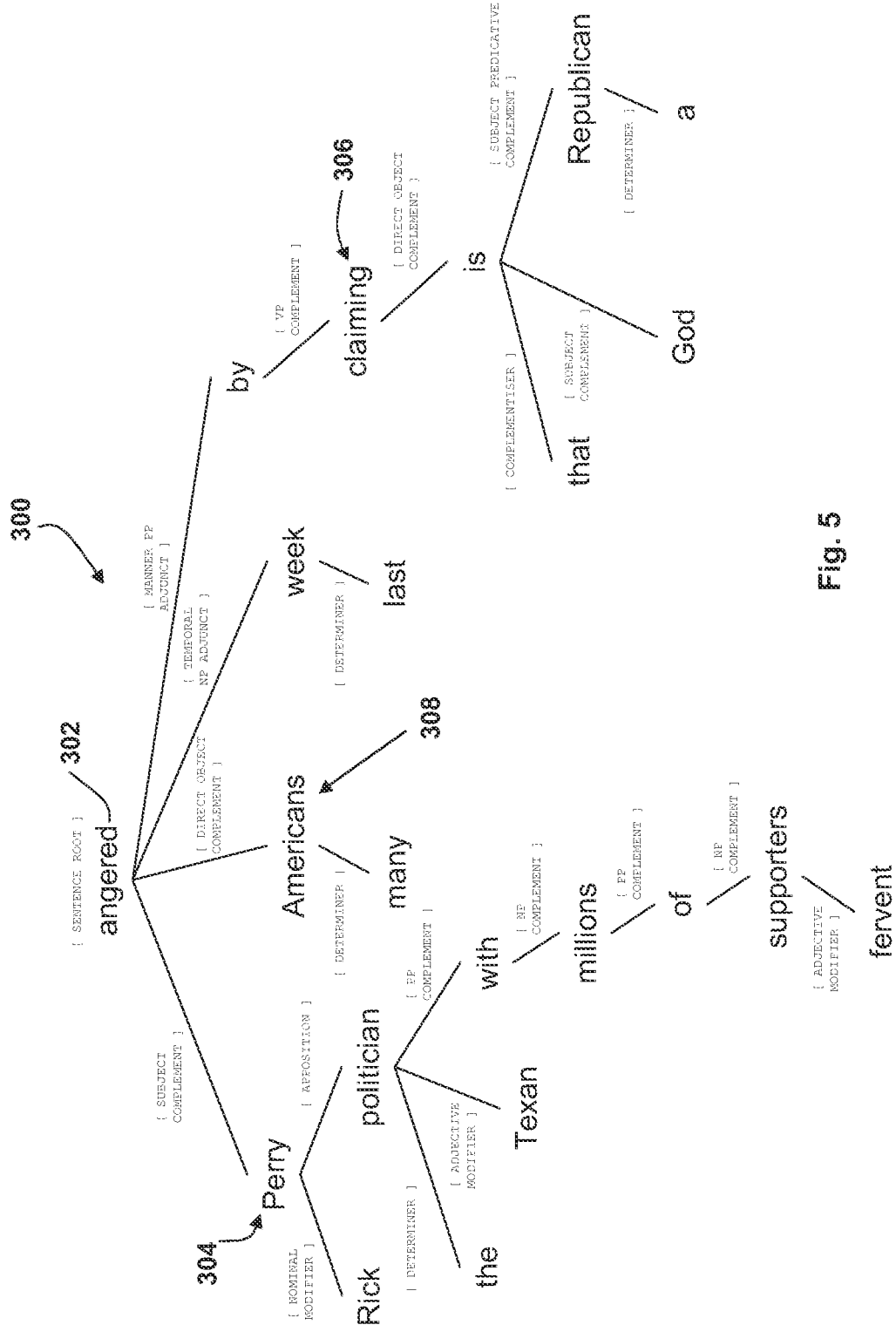
FIG. 5 shows a further tree analysing a further portion of natural language, which in this example is a sentence.

The tree 300 of FIG. 5, has the head verb "angered" as its root 302. Below the root 302, each node (e.g. 304, 306, 308) of the tree represents an entity of the natural language represented by the tree 300. Nodes to the left of a higher node represent an entity being a pre-head of the node above whereas nodes to the right of that higher node represent an entity being a post-head. For example, Perry at node 304 is a pre-head of the angered 300 whereas Americans at node 308 is a post head.

The various entities represented by the tree 300 are linked by the branches of the tree and form syntactic constituents. The tree 300 has thirty-six syntactic constituents which are listed in table (5) below.

Looking further at the multi-entity sentiment analysis, then the compositional OUT polarity calculated for each IN1+IN2 composition may be exploited to score individual entities that are mentioned in the constituent in question. The composition "[deterioration]$^{(-)}$"+"[of European culture]$^{(+)}$" accordingly involves two entities (i.e. [deterioration], [culture]) both of which are shaped by the compositional negative OUT polarity of the entire NP (Noun Phrase) despite one of the inputs being positive. The embodiment being described includes all individual base nouns (denoted as entity markers) across all constituents in its analysis.

The embodiment being described assumes that each constituent—a head may be with k pre- and/or j post-head dependents—stands for a unique (sub)part in the sentence in the sentence. Each constituent hence spans word indices [Li−k: Hi:Ri+j].

Accordingly, a given constituent and its internal compositional global polarity can be said to act as a structural proxy for a sentiment (sub)context in the sentence. Minimally, a constituent contains nothing but an entity marker (where an entity marker can be considered to be an entity of the natural language and is typically a word such as a base noun) in which case the sentiment of the constituent completely specifies the sentiment of the entity marker. Such atomic (sub)contexts can be seen as intrinsically lexical for they represent atomic pieces of information without alluding to any higher governing context(s), and are conceptually homologous to the elements in a keyword or bag-of-words representation of a sentence; they are a constituent whose sentiment cannot be analysed any further. In the sentence "[First, let's ascertain when it was that Vince last saw the robber]$^{(-)}$", lexical (sub) contexts include [it]$^{(N)}$, [Vince]$^{(N)}$, and [robber]$^{(-)}$, accordingly.

Analysis is more complex where a constituent hosts multiple entity markers in which case the sentiment of each entity marker is governed fully or shaped partially by the parent constituent. (Sub)contexts in which entity markers fall under the influence of other words and constructions are extrinsically contextual, correspondingly. In the above sentence, contextual (sub)contexts include "[saw the [robber]$^{(-)}$]$^{(-)}$", "[that [Vince]$^{(-)}$" last saw the [robber]$^{(-)}$]$^{(-)}$", and "[when [it]$^{(-)}$ was that [Vince]$^{(-)}$ last saw the [robber]$^{(-)}$]$^{(-)}$", amongst others. The maximally contextual (sub)context is correspondingly that offered by the top sentence-level constituent.

The fact that a sentence can contain multiple sentiment carriers, sentiment modulators, and entity markers means that entities' contextual sentiment properties can, and often do, differ from their atomic lexical properties and the top global polarity of the whole sentence. Consider the following short headline in which the entity [credit] is shaped by six (sub) contexts:

"[EU opposes [credit] crunch rescue package]$^{(-)}$"

Figure 3:
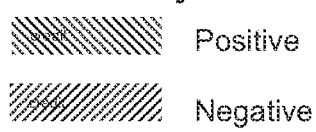
FIG. 3 shows the sentiment of constituents within the natural language EU opposes credit crunch rescue package.

The analysis of this sentence is diagrammatically shown in FIG. 3.

Ranging from the atomic (sub)context (1) (i.e. credit) to the top global (sub)context (6) (i.e. EU opposes credit crunch rescue package) via four intermediate (sub)contexts (2 . . . 5), the sentence affords multiple readings for the entity [credit]; i.e. credit can be seen to be positive or negative for various of the (sub)contexts.

The most basic sentential interpretation is that [credit] is fully negative since the sentence is negative as a whole. It is arguably the case that the sentential sentiment does to a certain degree shape all entity markers in the sentence. However, more subtle, interpretation can also be justified in which [credit] can be seen as positive or even neutral because [credit] is positive (or neutral) in itself because (sub)contexts 3 and 4 are positive, accordingly.

Thus, embodiments, instead of focusing on (typically not informative enough) atomic (sub)contexts or (potentially too holistic) global (sub)contexts, use a computational sentiment classifier to detect, typically, all possible sentiment signals. Thus, in the embodiment being described the analysis not only considers the two conventional levels of sentiment (atomic, global) (1: and 6: above) but all intermediate ones (intermediate) (2: . . . 5: above) as well. Other embodiments may detect less than all sentiment signals.

The occurrences of an entity e across all (sub)contexts in a given sentence along the atomic-global continuum gives rise to three gradient polarity distribution scores (i.e. e.pos, e.ntr, e.neg). For each (sub)context, embodiments may perform the following:

1) locate all entity markers in the (sub)context—step (704);

2) measure the sentiment distribution of the (sub)context—step (706); and 3) update the three polarity scores of each entity marker in the (sub)context—step (708).

The sentiment polarity distribution of each (sub)context can be measured in a number of different ways. The embodiment being described uses the compositional polarity (p∈{POS, NTR, NEG}) of the constituent constituting a given sentiment (sub)context. The overall gradient sentiment scores of each entity marker are hence calculated from the cumulative polarity distributions $D_1 \ldots D_n$ across all (sub)contexts $z_1 \ldots z_n$. The cumulative score for polarity p of entity e in sentence s with n (sub)contexts is obtained through equation (1).

Embodiments may further normalise, for each entity, the three cumulative polarity scores into proportional percentages, typically so that the three scores sum to 1 (i.e. 100%).

Equation (1)
$$e\_scr(p, e) = \sum_{i=1}^{n} fD_i$$

| Symbol | Definition |
|--------|------------|
| z | Constituent as sentiment (sub)context |
| p | Polarity p ∈ {POS, NTR, NEG} assigned to $z_i$ by sentiment grammar |

$$e\_scr(p, e) = \sum_{i=1}^{n} fD_i \qquad \text{Equation (1)}$$

| Symbol | Definition |
|---|---|
| $D_i$ | Polarity distribution of $z_i$: = $\begin{cases} f & \text{if } p \text{ is POS} \\ f & \text{if } p \text{ is NEG} \\ 0.5 \cdot f & \text{if } p \text{ is NTR} \end{cases}$ |
| s | Sentence |
| d | Dijkstra's shortest path distance between sentence root and head of $z_i$ |
| β | Coverage coefficient: length($z_i$)/length(s) |
| f | Weight for $z_i$: $\dfrac{\sqrt{d} + \beta}{\text{length}(s)}$ |

Within equation (1) different embodiments may vary how much or little a given (sub)context is allowed to contribute towards the overall score of each polarity for a given entity by varying the weights f and/or β.

On the one hand, global (and other high-level) (sub)contexts should intuitively be allowed to dominate intermediate and atomic ones. On the other hand, a sentential blanket coverage should not suppress the latter altogether because doing so would undermine the sensitivity of the classifier. It is for that reason that the raw polarity distribution scores are weighted using a set of empirically discovered (sub)context weight coefficients. The effect of the length/coverage coefficients (β), which estimates the gain of a given (sub)context over the sentence, is that longer (sub)contexts are boosted slightly. The dependency path length coefficient (d) controls the salience of each (sub)context on the basis of how directly dependent the (sub)context is on the sentence root constituent; in the equation given the closer the (sub)context to the root then the more influence it has.

In the following a sentence is analysed to exemplify how an embodiment of the invention would process that sentence:

"Rick Perry the Texan politician with millions of fervent supporters angered many Americans last week by claiming that God is a Republican"—hereinafter referred to as the "Rick Perry example".

As discussed above, the tree 300 showing the syntactic representation for this sentence is shown in FIG. 5 in which it can be seen that the root 302 of the tree is the head verb "angered". The syntactic representation is generated (step 802) by the analysis as described in relation to FIG. 1 after the natural language has been received by the processing circuitry 104 (step 800). Thus, it can be seen that the sentence is comprised of various constituents stemming from syntactic dependencies between words.

The following illustrates how the entities [God] and [Americans] are scored by the embodiment being described. Thus, these entities are represented in the sentence as: "[Rick Perry, the Texan politician with millions of fervent supporters, angered many [Americans] last week by claiming that [God] is a Republican.]$^{(-)}$"

TABLE (2)

| (Sub)context | Head | d | β | p | Score |
|---|---|---|---|---|---|
| [God] | | | | | |
| God | God | 4.0 | 0.0417 | POS | 0.085 |
| that God is a Republican | Republican | 3.0 | 0.2083 | POS | 0.081 |
| claiming that God is a Republican | claiming | 2.0 | 0.25 | POS | 0.069 |
| by claiming that God is a Republican | by | 1.0 | 0.2917 | POS | 0.054 |
| Rick Perry, the Texan politician with millions of fervent supporters, has angered many Americans by claiming that God is a Republican | angered | 1.0 | 1.0 | NEG | 0.083 |
| [Americans] | | | | | |
| many Americans | Americans | 1.0 | 0.0833 | NTR | 0.023 |
| Rick Perry, the Texan politician with millions of fervent supporters, has angered many Americans by claiming that God is a Republican | angered | 1.0 | 1.0 | NEG | 0.083 |

Reflecting its occurrences across both positive and negative (sub)contexts and its secondary adjunct clause position in the sentence, the entity [God] is scored with the triple: 77.6% (POS):0% (NTR):22.4% (NEG). This result implies a positive-leaning sentiment that the sentence expresses towards [God]. [Americans], on the other hand, is scored with the triple of 0%:(POS):21.3% (NTR):78.7% (NEG) because the algorithm detected that it did not occur in any positive (sub) context and that it is an internal complement of the (highly salient) main negative predicator in the sentence.

Figure 4:
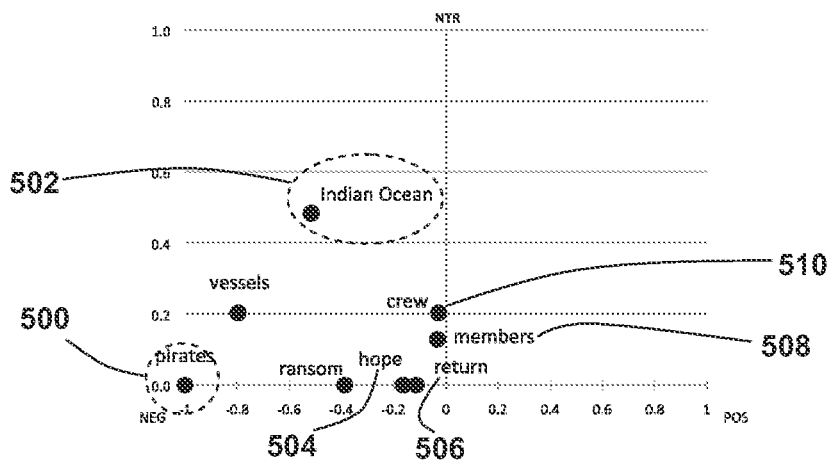
FIG. 4 shows how varies entities are individually scored within the natural language "Somali pirates are know to hijack vessels in the Indian Ocean in the hope of obtaining a ransom for the safe return of crew members"

FIG. 4 illustrates what kind of holistic computational sentiment evidence the algorithm is able to extract when fine-grained sentiment scores are interpreted collectively. The analysis suggests in that the sentence expresses strongly negative sentiment towards [pirates] 500 as they are negative in themselves and the subject complement of a negative predicator, understandably. Through basic sentiment reasoning, [Indian Ocean] 502 is classified as somewhat less negative because it merely expresses a location in which a negative event takes place. Through a more complex reasoning, the algorithm further treated the entities [hope] 504, [return]506, [crew] 508, and [members] 510 as the most positive amongst all of the entities in the sentence but the it did not classify them as categorically positive because 1) they occur in a positive reason adjunct PP which is less salient than the main negative predicator, and because 2) [ransom] introduces a degree of negativity (cf. higher NEG score). Indeed classifying [members], for example, as positive would indeed be an oversimplification because the fact remains that crew members were hijacked by pirates regardless of whether or not they were eventually freed. Similarly, [hope] is somewhat more negative than positive because, in order to obtain money (positive), vessels need to be hijacked first (negative). Hence these entities were treated as inherently mixed. The algorithm hence followed a chain of sentiment judgements that appears to emulate potentially complex sentiment judgements even though true sentiment reasoning is beyond the (and indeed any current) algorithm.

The embodiment being described does not resolve conflicting, concurrent sentiment perspectives, for example [ransom] being negative from the reader's point of view vs. positive from the pirates' viewpoint.

Embodiments of the invention are thus typically arranged to take a portion of natural language, process that natural language and output a sentiment for a plurality of the (sub)

contexts (constituents) of that natural language. This sentiment is typically returned relative to a root node of that natural language.

Thus, embodiments may provide sentiment parsing, together with various sentiment (sub)context salience coefficients and constraints, that enables a rich entity scoring framework, typically more comprehensive than prior art methods, which is able to detect, for all entity mentions, all possible fine-grained sentiments in a sentence.

Embodiments are typically able to model the flow and propagation of sentiment amongst atomic sentiment carries and entities (both of which can occur anywhere in the sentence) in a natural and principled fashion.

At least some embodiments are arranged to output the score that has been generated—step 710.

Figure 6:
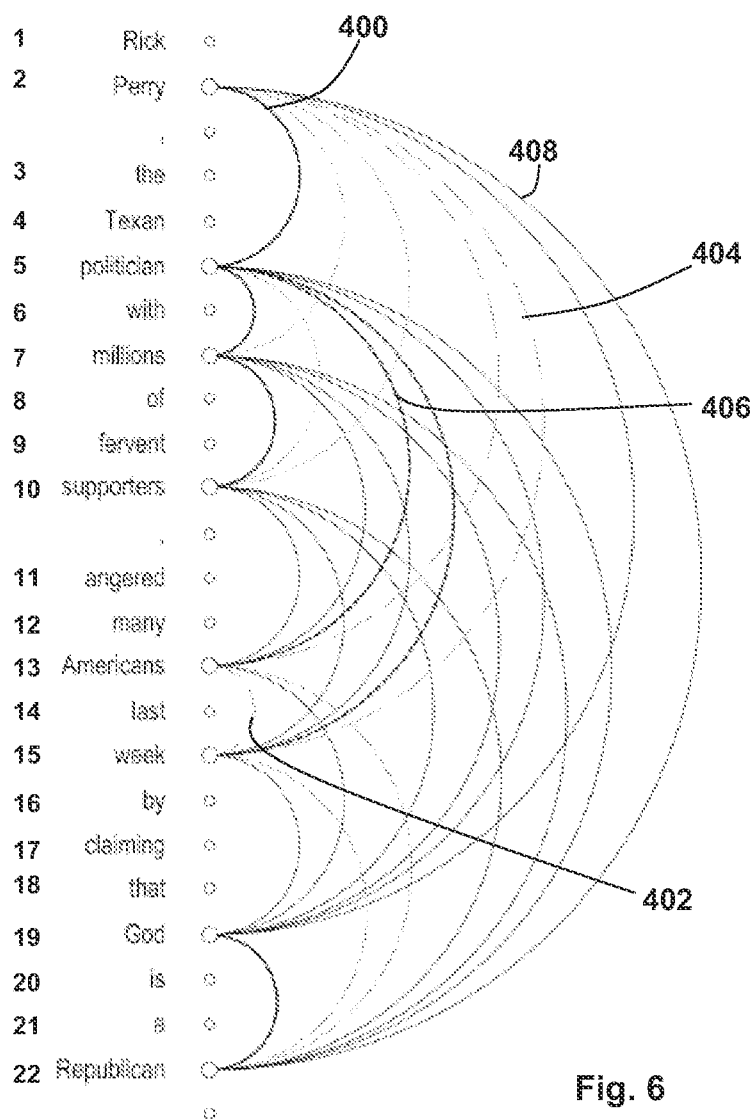
FIG. 6 shows the sentence, which is the subject of FIG. 5, highlighting the possible links between nouns thereof.

Now turning to FIGS. 5 and 6 the following describes so-called relational sentiment analysis in which, rather than returning sentiment to the root note, sentiment is returned between (sub)contexts.

Looking at the tree shown in FIG. 5, the skilled person will appreciate that the sentence need not be represented as a tree in order to determine the syntactic representation but this is a convenient visual representation convention. In another embodiment the tree may be provided as a list of dependencies, such as the following:

TABLE (3)

[each line is provided in the form: TYPE(GOVERNOR-WORD_INDEX, DEPENDENT-WORD_INDEX)]

NOMINAL_MODIFIER(Perry-2, Rick-1)
SUBJECT_COMPLEMENT(angered-13, Perry-2)
DETERMINER(politician-6, the-4)
ADJECTIVE_MODIFIER(politician-6, Texan-5)
APPOSITION_MODIFIER(Perry-2, politician-6)
PP_COMPLEMENT(politician-6, with-7)
NP_COMPLEMENT(with-7, millions-8)
PP_COMPLEMENT(millions-8, of-9)
ADJECTIVE_MODIFIER(supporters-11, fervent-10)
NP_COMPLEMENT(of-9, supporters-11)
DETERMINER(Americans-15, many-14)
DIRECT_OBJECT_COMPLEMENT(angered-13, Americans-15)
ADJECTIVE_MODIFIER(week-17, last-16)
TEMPORAL_ADJUNCT(angered-13, week-17)
PREPOSITION_ADJUNCT(angered-13, by-18)
VP_COMPLEMENT(by-18, claiming-19)
COMPLEMENTISER(is-22, that-20)
SUBJECT_COMPLEMENT(is-22, Republican-24)
SUBJECT_PREDICATIVE_COMPLEMENT(is-22, God-21)
DETERMINER(Republican-24, a-23)
CLAUSE_COMPLEMENT(claiming-19, is-22)

Other embodiments may use other forms of syntactic representation and/or other dependency relation labels.

Further, equation (1) (and equation (2)) below each refer to a distance through the tree calculated according to the Dijkstra algorithm. However, the skilled person will appreciate that other embodiments may use other methods, may be of exploring a tree.

A syntactic tree has a root node (e.g. 302 in FIG. 5)—the word to which all other others are attached. In the vast majority of cases (and when a tree is structurally complete), the main predicator ('head verb') of the main ('matrix') clause is the root because it does not 'depend' on any other word. Hence in the sentence "John gave Mary a present"

the head verb 'gave' (predicator) is the root because 1) it is not linked to any other word, and 2) the arguments "John" (subject complement), "Mary" (direct object complement), and "present" (indirect object complement) are linked to and hence depend on it. Similarly, the root node is "made" in the complex sentence:

"Even though many negative things have been said about it in the past, the UN treaty on human rights has made our lives much better".

Some embodiments of the invention are arranged such that a sentiment parsing algorithm (provided by the sentiment parser 152) assesses the tree starting at the root 302 and tries to find the deepest child node under it recursively.

Further, should the natural language that is to be analysed is fragmentary, incomplete, etc., then embodiments may determine that there are multiple root-like elements to the portion of natural language. Some embodiments of the invention may, in such circumstances, generate a separate tree (or other syntactic representation).

Thus, returning to the Rick Perry example, the sentence is constituted by the following structural elements:

TABLE (4)

[individual words, i.e. leaf nodes in the tree]

Rick [NOUN]
Perry [NOUN]
the [DETERMINER]
Texan [ADJECTIVE]
politician [NOUN]
with [PREPOSITION]
millions [NOUN]
of [PREPOSITION]
fervent [ADJECTIVE]
supporters [NOUN]
angered [VERB]
many [DETERMINER]
Americans [NOUN]
last [DETERMINER]
week [NOUN]
by [PREPOSITION]
claiming [VERB]
that [COMPLEMENTISER]
God [NOUN]
is [VERB]
a [DETERMINER]
Republican [NOUN]

Thus, in the Rick Perry example, the sentiment parsing algorithm determines that the sentence has the following thirty-six (36) constituents. The following table highlights what those constituents are, their type, the pre-head of the constituent (reflected in the tree of FIG. 5 as depending to the left of a node), a head of the constituent (reflected as being a node of a tree), a post-head (reflected as depending to the right of a node), and the sentiment that is determined for that constituent.

TABLE (5)

| Constituent | Type | Pre-head | Head | Post-head | Sentiment |
|---|---|---|---|---|---|
| 1. Republican | [NOUN/NP] | | Republican | | NEUTRAL |
| 2. a Republican | [NP] | a | Republican | | NEUTRAL |
| 3. is a Republican | [VP] | | is | Republican | NEUTRAL |
| 4. God | [NOUN/NP] | | God | | POSITIVE |

TABLE (5)-continued

| Constituent | Type | Pre-head | Head | Post-head | Sentiment |
|---|---|---|---|---|---|
| 5. God is a Republican | [CLAUSE] | God | is | Republican | POSITIVE |
| 6. that God is a Republican | [CLAUSE] | that, God | is | Republican | POSITIVE |
| 7. claiming | [VP] | | claiming | | NEUTRAL |
| 8. claiming that God is a Republican | [VP] | | claiming | is | POSITIVE |
| 9. by | [PREPOSITION] | | by | | NEUTRAL |
| 10. by claiming that God is a Republican | [PREPOSITION PHRASE] | | by | claiming | POSITIVE |
| 11. week | [NOUN/NP] | | week | | NEUTRAL |
| 12. last week | [NP] | last | week | | NEUTRAL |
| 13. Americans | [NOUN/NP] | | Americans | | NEUTRAL |
| 14. many Americans | [NP] | many | Americans | | NEUTRAL |
| 15. angered | [VP] | | angered | | NEGATIVE |
| 16. angered many Americans | [VP] | | angered | Americans | NEGATIVE |
| 17. angered many Americans last week | [VP] | | angered | Americans, week | NEGATIVE |
| 18. angered many Americans last week by claiming that God is a Republican | [VP] | | angered | Americans, week, by | NEGATIVE |
| 19. supporters | [NOUN/NP] | | supporters | | POSITIVE |
| 20. fervent supporters | [NP] | fervent | supporters | | POSITIVE |
| 21. of | [PREPOSITION] | | of | | NEUTRAL |
| 22. of fervent supporters | [PREPOSITION PHRASE] | | of | supporters | POSITIVE |
| 23. millions | [NOUN/NP] | | millions | | NEUTRAL |
| 24. millions of fervent supporters | [NP] | | millions | of | POSITIVE |
| 25. with | [PREPOSITION] | | with | | NEUTRAL |
| 26. with millions of fervent supporters | [PREPOSITION PHRASE] | | with | millions | POSITIVE |
| 27. politician | [NOUN/NP] | | politician | | NEUTRAL |
| 28. Texan | [ADJECTIVE] | | Texan | | NEUTRAL |
| 29. Texan politician | [NP] | Texan | politician | | NEUTRAL |
| 30. the Texan politician | [NP] | The, Texan | politician | | NEUTRAL |
| 31. the Texan politician with millions of fervent supporters | [NP] | The, Texan | politician | with | POSITIVE |
| 32. Perry | [NOUN/NP] | | Perry | | NEUTRAL |
| 33. Rick | [NOUN/NP] | | Perry | | NEUTRAL |
| 34. Rick Perry | [NP] | Rick | Perry | | NEUTRAL |
| 35. Rick Perry, the Texan politician with millions of fervent supporters | [NP] | | Perry | politician | POSITIVE |
| 36. Rick Perry, the Texan politician with millions of fervent supporters angered many Americans last week by claiming that God is a Republican | [SENTENCE] | Perry | angered | Americans, week, by | NEGATIVE |

Thus, using the techniques described in relation to FIGS. 1 to 3 and 7 it is possible to determine a sentiment for each of the constituents of the Rick Perry example, or indeed any other portion of natural language as reflected in the right-most column of the table.

FIG. 6 lists each of the entities of the Rick Perry example in a column 400 on the left-hand side of the Figure. Embodiments of the invention allow the sentiment between entities of the natural language to be determined. In the embodiment being described, a relation classifier is capable of providing a relational sentiment for entities which are simple base Noun Phrases (NP).

A base NP is either 1) a singular noun (e.g. "station") or 2) or a nominal constituent made of one or more nouns (e.g. "missile testing station"). Hence in this embodiment no adjectives ("fervent"), verbs ("angered"), adverbs ("boldly"), or prepositions ("without") are considered as entities for which a sentiment can be determined. In other embodiments further analysis may be performed and any other entity made of any word(s) or the like may be analysed.

In the embodiment being described, the sentiment parsing algorithm generates:
  a full syntactic dependency parse (as represented by the tree of FIG. 5); and
  a full sentiment parse in which each individual syntactic constituent has its own internal constituent-wide sentiment polarity (as exemplified by the table above).
[Other Embodiments May Assign Other Sentiment Properties, Other than Just Sentiment Polarity Values]

Subsequently, the relation classifier 154 establishes all possible entity mention pairs and determines, as described below, gradient sentiment scores to each pair. These pairs are represented by each of the lines of FIG. 6. In other embodiments, the gradient sentiment scores may be determined for selective pairs of entities rather than all of them.

The weight of the line on FIG. 6 gives an indication of the sentiment scores, as determined by the relation classifier, for the connection between each pair of entities.

The line 400 between entity 'Perry' and entity 'politician' is shown in solid black to indicate fully positive sentiment. As such, lines in solid black are intended to reflect fully positive sentiment.

The line 402 between entity 'Americans' and entity 'week' is shown with a line of a long dash and is intended to illustrate a sentiment which is fully negative (as is the line 404 between 'Perry' and 'Americans'). As such, lines of long dashes are intended to reflect a fully negative sentiment.

The line 406 between entity 'politician' and 'Americans' is shown using a further shading intended to indicate that the line is between fully positive and fully negative (mixed sentiment). In the example, the line 406 reflects the sentiment scores of [Pos 0.000; Ntr 0.115 and Neg 0.885].

The line 408 between the entity 'Perry' and 'Republican' is also somewhere between fully negative and fully but is more positive than line 406. In the example, the score for the line 408 is [Pos 0.276; Ntr 0.172; and Neg 0.552], accordingly.

Note that the atomic (sub)contexts headed by the two entities themselves are not included in the analysis. In other embodiments, the linked entities can be included in the analysis.

For each entity mention pair, the relation classifier considers the sentiment properties of all constituents that connect the two entities syntactically.

The system achieves relational sentiment analysis by establishing the shortest syntactic dependency path between each entity pair, and then analysing the sentiment (sub)contexts that make up the dependency path (step 804). Some embodiments may use the link determining module 162 to determine the dependency path. In embodiments that utilise a tree as the syntactic representation of the natural language being analysed, a tree search, such as a Dijkstra search, may be used to determine the shortest path through the tree to determine the shortest path between the two entities.

Embodiments of the relation classifier typically utilise the relative dependencies amongst entity mentions and interconnecting sentiment (sub)contexts because the scoring process does not proceed from one atomic (sub)context) (an entity mention itself) to a global (sub)context (the sentence root) but rather from one entity mention to another via any number of intermediate (sub)contexts and that may include the global (sub)context (sentence root).

In the embodiment being described, the relation classifier traverses the dependency path using a limited sliding window each of which represents a (sub)context triple $(z_{i-1}, z_i, z_{i+1})$ and determines the polarity distribution of each (sub)context. The overall sentiment scores of a sentiment relation are derived from the cumulative polarity distributions $D1 \ldots Dn$ across all (sub)contexts $z1 \ldots zn$, respectively. The cumulative scores for the three polarity counts (r.pos, r.ntr, r.neg) for sentiment relation r between two entities (e1, e2) in sentence s with n (sub)contexts is obtained through the following formula (step 806):

$$r\_scr(r, e_1, e_2) = \sum_{i=1}^{n} D_i \qquad \text{equation (2)}$$

| Symbol | Definition |
| --- | --- |
| $z_i$ | constituent as sentiment (sub)context |
| $t_i$ | Triple of previous, current, and next (sub)context along the path between $e_1$ and $e_2$: $(z_{i-1}, z_i, z_{i+1})$ |
| p | Polarity $p \in \{POS, NTR, NEG\}$ assigned to $t_i$ by sentiment grammar |
| D | Polarity distribution of $z_i$: = $\begin{cases} r.pos = \alpha, r.ntr = 1 - \alpha & \text{if p is POS} \\ r.neg = \alpha, r.ntr = 1 - \alpha & \text{if p is NEG} \\ r.ntr = \alpha & \text{if p is NTR} \end{cases}$ |
| d | Dijkstra's shortest path distance between $e_1$ and $e_2$ heads |
| $\alpha$ | (Sub)context score: = $\sqrt{\dfrac{1}{\log_2(d)}}$ |

For each relation, the three resultant polarity scores are further normalised into proportional percentages.

In this embodiment, a sliding window together with equation (2) above is used to determine a sentiment between entities of the portion of natural language. However, in other embodiments other mechanisms may be used to make this determination. For example, in other embodiments an equation other than equation (2) may be used.

In further embodiments, a machine learning algorithm may be used as opposed to the window and equation (2).
Example Analysis:
"[[Rick Perry], the Texan [politician] with [millions] of fervent [supporters], angered many [Americans] last week by claiming that [God] is a [Republican].](−)"

This sentence (i.e. natural language) is analysed and the following scores for the sentiment between entities is determined, in some embodiments by the calculating module 164, as follows:

TABLE (6)

| Entity 1 | Entity 2 | Relation | POS | NTR | NEG |
|---|---|---|---|---|---|
| Rick Perry | politician | POS | 1 | 0 | 0 |
| Rick Perry | supporters | POS | 0.792 | 0.208 | 0 |
| Rick Perry | Americans | NEG | 0 | 0 | 1 |
| Rick Perry | God | NEG | 0.396 | 0.208 | 0.396 |
| Rick Perry | Republican | NEG | 0.276 | 0.172 | 0.552 |
| politician | supporters | POS | 0.828 | 0.172 | 0 |
| politician | Americans | NEG | 0 | 0.115 | 0.885 |
| politician | God | NEG | 0.307 | 0.233 | 0.46 |
| politician | Republican | NEG | 0.198 | 0.208 | 0.594 |
| supporters | Americans | POS | 0.498 | 0.252 | 0.249 |
| supporters | God | POS | 0.472 | 0.291 | 0.236 |
| supporters | Republican | POS | 0.45 | 0.281 | 0.27 |
| Americans | God | NEG | 0.396 | 0.208 | 0.396 |
| Americans | Republican | NEG | 0.276 | 0.172 | 0.552 |
| God | Republican | POS | 1 | 0 | 0 |

Some further examples of sliding windows.

The following examples illustrates how each sliding window state considers the sentiment of each of the nodes (prev, current, next) as well as their grammatical properties. The final sentiment judgement for each node triple is made by the sentiment grammar and the above equation (2).

The following example shows, in detail, how the sliding window and the equation (1) above are used, by some embodiments, to determine the sentiment between two entities in the Rich Perry example and in particular between the entities: [Rick Perry] and [supporters] (i.e. between entities 2 and 10).

Distance between two entities: 4 (as determined by a path through the tree as shown in FIG. 5)—via the nodes Perry; Politician; with; millions; of; supporters.

Sentiment determined between [Rick Perry] and [supporters]: POSITIVE
   Positive: 0.792
   Neutral: 0.208
   Negative: 0.000

In the following example, the following notation has been used:
   <: denotes previous node along dependency path
   ^: denotes current node along dependency path
   >: denotes next node along dependency path

---

[E1: @1 ^12 Perry POSITIVE SUBJECT_COMPLEMENT]
...
   [N: {5} dominance:EDGE <:1 ^:5 >:6 <:Perry ^:politician
   >:with <:POSITIVE ^:POSITIVE >:POSITIVE
   <:SUBJECT_COMPLEMENT ^:APPOSITION
   >:PREPOSITIONAL_COMPLEMENT pos:
   0.656 ntr: 0.344 neg: 0.000 ]

--- i.e.; The second position of the window is positioned with entity 1 (Rick) as the zi−1 (prev) position; with entity 5 (Politician) as the z (current) position; and with entity 6 (with) as the (zi+1) next position. The three entities at the three positions each have positive sentiment according to the sentiment parse being used and exhibit the syntactic functions SUBJECT_COMPLEMENT; APPOSITION; and PREPOSITIONAL_COMPLEMENT.

Rules within the system score this sliding window triple as [pos: 0.656 ntr: 0.344 neg: 0.000]; i.e. there is roughly twice as much confidence that the node triple is positive than it is negative.

1) For each sliding window triple, determine sentiment salience/dominance
   <denotes previous node in sliding window triple
   ^ denotes current node in sliding window triple
   >denotes next node in sliding window triple
   [<SUBJECT_COMPLEMENT][^ VP][>DIRECT_OBJECT_COMPLEMENT]=>dominance=^

That is if the previous node (i.e. the z−1 node) is a SUBJECT_COMPLEMENT; the current node (the zth node) is a VP; and the next node (ie the z+1 node) is a DIRECT_OBJECT_COMPLEMENT, then the current node dominates the window.

[<VP][^DIRECT_OBJECT_COMPLEMENT]
      [>PREPOSITIONAL_COMPLEMENT]=>dominance=<

That is if the previous node (i.e. the z−1 node) is a VP; the current node (the zth node) is a DIRECT_OBJECT_COMPLEMENT; and the next node (i.e. the z+1 node) is a PREPOSITIONAL COMPLEMENT, then the previous node dominates the window.

[<PREPOSITIONAL_COMPLEMENT]
      [^NP_COMPLEMENT][>PARTICIPIAL_MODIFIER]=>dominance=>

That is if the previous node (i.e. the z−1 node) is a PREPOSITIONAL_COMPLEMENT; the current node (the zth node) is a NP_COMPLEMENT; and the next node (i.e. the z+1 node) is a PARTICIPIAL_MODIFIER, then the next node dominates the window.

Typically, these rules are derived as discussed in the 2007 Sentiment Analysis paper highlighted above.

Further rules may then be used to check sentiment polarity axioms, polarity rankings, and non-neutral sentiment propagation:

---

[< POS] [^ POS] [> POS] => sliding window is POS
[< NTR] [^ NTR] [> NTR] => sliding window is NTR
...
[< NTR|NEG] [^ NTR|NEG] [> NEG] => sliding window is NEG
...
[dominance = ^] [< NEG] [^ POS] [> POS] => sliding window is POS
[dominance = ] [< POS] [^ NEG] [> POS] => sliding window is NEG
...
[dominance = <] [< NTR] [^ POS] [> NEG] => sliding window is POS
...
[dominance = >] [< POS] [^ NEG] [> POS] => sliding window is POS

---

Typically, again, these rules are derived as discussed in the 2007 Sentiment Analysis paper highlighted above.

In the embodiment being described, equation (2) is used to derive a numerical value for the window triple once the rules have been applied.

---

...
[N: {6} dominance:E1 <:5 ^:6 >:7 <:politician ^:with >:millions
<:POSITIVE ^:POSITIVE >:POSITIVE <:APPOSITION
^:PREPOSITIONAL_COMPLEMENT >:NP_COMPLEMENT pos:
1.313 ntr: 0.687 neg: 0.000 ]
...
[N: {7} dominance:E1 <:6 ^:7 >:8 <:with ^:millions >:of <:POSITIVE
^:POSITIVE >:POSITIVE <:PREPOSITIONAL_COMPLEMENT
^:NP_COMPLEMENT >:PREPOSITIONAL_COMPLEMENT pos:
1.969 ntr: 1.031 neg: 0.000 ]
...
[N: {8} dominance:E2 <:7 ^:8 >:10 <:millions ^:of >:supporters
<:POSITIVE ^:POSITIVE >:POSITIVE <:NP_COMPLEMENT
^:PREPOSITIONAL_COMPLEMENT >:NP_COMPLEMENT pos:
2.625 ntr: 1.375 neg: 0.000 ]
...
[E2: @10 ^8 supporters POSITIVE NP_COMPLEMENT]

Equation (2) above is used to sum the scores for each of the window positions and the resulting values are normalised so that the three individual weights of the triple (i.e. belief in positive sentiment; belief in negative sentiment; and belief in neutrality) sum to 1. Other embodiments may of course perform other manipulation on the scores of the triples.

Thus, in this example, the following final sentiment scores are obtained, which may be by using the calculating module 164:

Positive: 0.792
Neutral: 0.208
Negative: 0.000

That is, there is a 79% belief that the relationship between [Rick Perry] (entity 1) and [supporters] (entity 10) is positive with an associated 21% belief that it might be neutral.

In other embodiments, rather than using rules to determine a score between two entities, machine learning may be used to determine the sentiment between two entities. In some embodiments, a training set could be used to learn, and subsequently, the trained system may output sentiment scores and/or labels.

In a second example, to illustrate the sliding window, a calculation of the sentiment between [supporters] (the tenth entity) and [Republican] (the twenty second entity) is described below.

Negative: 0.270

At least some embodiments are arranged to output the relational sentiment score between the two entities (step 808).

Some embodiments may be arranged to determine a confidence of the sentiment that can be derived for a portion of natural language. This sentiment confidence may be for the sentiment derived for the overall portion of language and/or for individual entities and between entities (i.e. relational sentiment analysis).

Generally, the purpose of a sentiment confidence scorer 156 is to assign a sentiment confidence score to a piece of natural language which gives a metric for the confidence that can be placed in the sentiment score for that natural language. That is the sentiment confidence is a measure of how difficult a given piece of natural language appears to be for a sentiment classifier.

In order to provide a sentiment confidence score, the sentiment confidence scorer is arranged, after the natural language has been received at a processing circuitry 104 (step 900) to parse the natural language to apply a set of sentiment ambiguity indicators (which may be thought of as metrics) thereto in order to determine the confidence score. The indicators may be arranged to take into account one or more of the following parameters: length of natural language (which may for example be text length); number of sentiment sub-con-

---

```
Distance: 8
Sentiment: POSITIVE
Positive: 0.450
Neutral: 0.281
Negative: 0.270
[E1: @10 ^8 supporters POSITIVE NP_COMPLEMENT] ... [N: {8}
dominance:E2 <:10 ^:8 >:7 <:supporters ^:of >:millions <:POSITIVE
^:POSITIVE           >:POSITIVE            <:NP_COMPLEMENT
^:PREPOSITIONAL_COMPLEMENT >:NP_COMPLEMENT pos: 0.562 ntr: 0.438
neg: 0.000 ]
...
[N: {7} dominance:E1 <:8 ^:7 >:6 <:of ^:millions >:with <:POSITIVE
^:POSITIVE       >:POSITIVE         <:PREPOSITIONAL_COMPLEMENT
^:NP_COMPLEMENT >:PREPOSITIONAL_COMPLEMENT pos: 1.123 ntr: 0.877 neg:
0.000 ]
...
[N: {6} dominance:E2 <:7 ^:6 >:5 <:millions ^:with >:politician <:POSITIVE
^:POSITIVE           >:POSITIVE            <:NP_COMPLEMENT
^:PREPOSITIONAL_COMPLEMENT >:APPOSITION pos: 1.685 ntr: 1.315 neg: 0.000 ]
...
[N: {5} dominance:EDGE <:6 ^:5 >:1 <:with ^:politician >:Perry <:POSITIVE
^:POSITIVE     >:POSITIVE         <:PREPOSITIONAL_COMPLEMENT
^:APPOSITION >:SUBJECT_COMPLEMENT pos: 2.247 ntr: 1.753 neg: 0.000
]
...
[N: {1} dominance:E2 <:5 ^:1 >:12 <:politician ^:Perry >:angered
<:POSITIVE       ^:POSITIVE        >:NEGATIVE         <:APPOSITION
^:SUBJECT_COMPLEMENT >:UNKNOWN pos: 2.247 ntr: 2.192 neg: 0.562 ]
...
[N: {12} dominance:EDGE <:1 ^:12 >:17 <:Perry ^:angered >:by <:POSITIVE
^:NEGATIVE   >:POSITIVE   <:SUBJECT_COMPLEMENT    ^:UNKNOWN
>:PREPOSITIONAL_COMPLEMENT pos: 2.247 ntr: 2.630 neg: 1.123 ]
...
[N: {17} dominance:E1 <:12 ^:17 >:18 <:angered ^:by >:claiming
<:NEGATIVE         ^:POSITIVE         >:POSITIVE         <:UNKNOWN
^:PREPOSITIONAL_COMPLEMENT >:CLAUSE_COMPLEMENT pos: 2.247 ntr: 3.068
neg: 1.685 ]
...
[N: {18} dominance:EDGE <:17 ^:18 >:23 <:by ^:claiming >:Republican
<:POSITIVE ^:POSITIVE >:POSITIVE <:PREPOSITIONAL_COMPLEMENT
^:CLAUSE_COMPLEMENT >:CLAUSE_COMPLEMENT pos: 2.808 ntr: 3.507 neg:
1.685 ]
...
[E2: @23 ^18 Republican POSITIVE CLAUSE_COMPLEMENT]
``` texts (i.e. constituents) in portion of natural language; the number of entities (which might be words) that have a context within the portion of natural language; the number of entities (which might be words) which reverse the polarity; the number of entities (which might be words) which have a positive and/or a negative sentiment with the portion of natural language; the number of unknown entities (which might be words) within the portion of natural language; or the like.

Thus, embodiments may in effect determine the difficulty, which in this sense reflects the possibility (as opposed to probability) of the sentiment algorithm outputting an incorrect analysis, which reflects 1) the degree of sentiment ambiguity in text, 2) the saturation of sentiment in text, 3) the structural complexity of a piece of text, and 4) the lexical coverage of the algorithm, and the like.

In the embodiment being described the confidence scorer has the following inputs:

SENTIMENT LEXICON:
A list of words and phrases annotated with prior sentiment polarities and sentiment reversal properties, and sentiment word sense ambiguity tags.
Sentiment tags: positive (POS)|neutral (NTR)|negative (NEG)
Sentiment reversal tags: equative (EQU)|reversive (REV)
Sentiment ambiguity tags:
3-way ambiguous between positive/neutral/negative (ANY)
2-way ambiguous between positive/negative (POS-NEG)
2-way ambiguous between positive/neutral (NTR-POS)
2-way ambiguous between negative/neutral (NTRNEG)
NEUTRAL WORD LEXICON: a list of words and phrases that do not contain any sentiment
GRAMMATICAL PARSE: a structural representation of a piece of natural language that reflects its grammatical structure, which may be provided by the output of the sentiment parsing algorithm described above.
SENTIMENT PARSE: a representation which reflects the sentiment (sub)contexts determined by the sentiment parsing algorithm.

Sentiment confidence estimations are obtained using multiple confidence indicators which, for the embodiment being described, are listed below. In other embodiments there may be other rules or indeed, not all of the rules may be utilised.

[TEXT LENGTH]:
$\mathrm{sqrt}((1/x)+y)$ where x=# of words in sentence; y=length coefficient (default 0.4)
This indicator assumes that the longer the text, or other piece of natural language, the greater the possibility of incorrect analysis.

[SENTIMENT SUBCONTEXTS]:
$\mathrm{sqrt}((1/x)+y)$ where x=# of sentiment subcontexts in text; y=length coefficient (default 0.4)
This indicator assumes that the greater the number of sentiment subcontexts the greater the possibility of incorrect analysis.

[POS/NTR/NEG AMBIGUITY]:
$1/(x+y)$ where x=# of words with pos/ntr/neg sentiment in sentence; y=3-way coefficient (default 3)
This indicator assumes that the more ambiguous a word is the greater the possibility of choosing an incorrect sense.

[POS/NEG AMBIGUITY]:
$1/(x+y)$ where x=# of words with pos/ntr/neg sentiment in sentence; y=2-way coefficient (default 2)
This indicator assumes that the more ambiguous a word is the greater the possibility of choosing an incorrect sense.

[POS/NTR AMBIGUITY]:
$1/(x+y)$ where x=# of words with pos/ntr sentiment in sentence; y=2-way coefficient (default 1)
This indicator assumes that the more ambiguous a word is the greater the possibility of choosing an incorrect sense.

[NEG/NTR AMBIGUITY]:
$1/(x+y)$ where x=# of words with neg/ntr sentiment in sentence; y=2-way coefficient (default 1)
This indicator assumes that the more ambiguous a word is the greater the possibility of choosing an incorrect sense.

[REV AMBIGUITY]:
$(x+1)^3$ where x=# of words with rev sentiment property in sentence
This indicator assumes that the more reversive words (i.e. words that reverse the meaning) there are the great the possibility of incorrect sentiment polarity reversal.

[POS-NTR SATURATION]:
$\mathrm{sqrt}(1-(1/\mathrm{abs}(x-y)+1))$ where x=# of positive words in sentence; y=# of neutral words in sentence.
This indicator assumes that the greater the gap between two sentiment polarities the easier the analysis.

[NEG-NTR SATURATION]:
$\mathrm{sqrt}(1-(1/\mathrm{abs}(x-y)+1))$ where x=# of negative words in sentence; y=# of negative words in sentence
This indicator assumes that the greater the gap between two sentiment polarities the easier the analysis.

[POS-NEG SATURATION]:
$\mathrm{sqrt}(1-(1/\mathrm{abs}(x-y)+1))$ where x=# of positive words in sentence; y=# of negative words in sentence
This indicator assumes that the greater the gap between two sentiment polarities the easier the analysis.

[UNKNOWN WORDS]:
$1-(x/y)$ where x=# of unknown words in sentence; y=# of words in sentence
This indicator assumes that the greater the number of unknown words the greater the possibility of incorrect analysis.

The output of each of the indicators (which could be thought of as a rule) may be thought of as being a sub-score or factor of the overall confidence and, in order to obtain an overall confidence score for the piece of natural language that is analysed, the sub-scores may be combined. It will be appreciated that such embodiments are likely to be advantageous in order that the overall accuracy of the confidence score is increased.

Thus, the embodiment being described processes the sub-scores as follows:
1) only use indicators that yielded non-zero scores in the overall score calculation
2) obtain an average measure across all non-zero scores using the following formula: s/a where s=sum of scores set; a=scores set size

The invention claimed is:
1. A computer implemented method for analysing natural language contained in electronic text to determine a sentiment between two entities discussed in the natural language, comprising the following steps:
receiving, via an input module, the electronic text containing the natural language at a processing circuitry;
using an input/output subsystem of the processing circuitry to move the received natural language to a data storage;
analysing the natural language in the data storage to determine a syntactic representation which shows syntactic constituents of the analysed natural language and to determine a sentiment score of each constituent, wherein each constituent is a sentiment (sub)context, and wherein determining a sentiment score of each constituent comprises:
determining a polarity distribution of each (sub)context, and
calculating an entity sentiment score for each entity from the cumulative polarity distributions $D_1 \ldots D_n$ across all (sub)contexts $z_1 \ldots z_n$, the entity sentiment score for polarity p of entity e in sentence s with n (sub)contexts being obtained through the equation:

$$e\_scr(p, e) = \sum_{i=1}^{n} fD_i$$

wherein
z is Constituent as sentiment (sub)context
p is Polarity p∈{POS, NTR, NEG} assigned to z, by sentiment grammar $$D_i \text{ is Polarity distribution of } z_j := \begin{cases} f & \text{if } p \text{ is POS} \\ f & \text{if } p \text{ is NEG} \\ 0.5 \cdot f & \text{if } p \text{ is } NTR \end{cases}$$

s is Sentence
d is Dijkstra's shortest path distance between sentence root and head of $z_i$
β is Coverage coefficient: length($z_i$)/length(s)
f is Weight $f$ or $z_i$:

$$\frac{\sqrt{d} + \beta}{\text{length}(s)};$$

determining which constituents link the two entities;
calculating an overall sentiment score for the sentiment between the two entities by processing the sentiment score of each constituent of the constituents determined to link the two entities; and
outputting, by a computer processor, the overall sentiment score for the sentiment between the two entities discussed by the natural language contained in the electronic text.

2. A method according to claim 1 wherein the syntactic representation is a tree showing how the entities within the natural language are connected to one another.

3. A method according to claim 2, wherein the determination as to which constituents link the two entities comprises performing a tree search to determine a shortest path.

4. A method according to claim 1 wherein a sentiment score for a constituent is determined from an entity sentiment score of an entity within the natural language.

5. A method according to claim 1, wherein processing the sentiment score of each constituent of the constituents determined to link the two entities comprises using a windowed method to include a plurality of entities.

6. A method according to claim 5 wherein the windowed method comprises using a set of rules to provide a score for the arrangement of entities within the window.

7. A non-transitory computer-readable medium storing executable computer program code for analysing natural language contained in electronic text to determine a sentiment between two entities discussed in the natural language, the computer program code executable to perform steps comprising:
receiving, via an input module, the elecronic text containing the natural language at a processing circuitry;
using an input/output subsystem of the processing circuitry to move the received natural language to a data storage;
analysing the natural language in the data storage to determine a syntactic representation which shows syntactic constituents of the analysed natural language and to determine a sentiment score of each constituent, wherein each constituent is a sentiment (sub)context, and wherein determining a sentiment score of each constituent comprises:
determining a polarity distribution of each (sub)context, and
calculating an entity sentiment score for each entity from the cumulative polarity distributions $D_1 \ldots D_n$ across all (sub)contexts $z_1 \ldots z_n$, the entity sentiment score for polarity p of entity e in sentence s with n (sub)contexts being obtained through the equation:

$$e\_scr(p, e) = \sum_{i=1}^{n} fD_i$$

wherein
z is Constituent as sentiment (sub)context
p is Polarity p∈{POS, NTR, NEG} assigned to $z_i$ by sentiment grammar $$D_i \text{ is Polarity distribution of } z_j := \begin{cases} f & \text{if } p \text{ is POS} \\ f & \text{if } p \text{ is NEG} \\ 0.5 \cdot f & \text{if } p \text{ is } NTR \end{cases}$$

s is Sentence
d is Dijkstra's shortest path distance between sentence root and head of $z_i$
β is Coverage coefficient: length($z_i$)/length(s)
f is Weight $f$ or $z_i$:

$$\frac{\sqrt{d} + \beta}{\text{length}(s)};$$

determining which constituents link the two entities;
calculating an overall sentiment score for the sentiment between the two entities by processing the sentiment score of each constituent of the constituents determined to link the two entities; and
outputting the overall sentiment score for the sentiment between the two entities discussed by the natural language contained in the electronic text.

8. A computer system for analyzing natural language contained in electronic text to determine a sentiment between two entities discussed in the natural language comprising:
a computer processor for executing computer program code; and
a non-transitory computer-readable storage medium storing executable computer program code comprising:
an input module arranged to receive the electronic text containing the natural language at a processing circuitry;

an input/output subsystem of the processing circuitry arranged to move the received natural language to a data storage;
an analysing module arranged to analyse the natural language in the data storage to determine a syntactic representation which shows syntactic constituents of the analysed natural language to determine a sentiment score of each constituent t, wherein each constituent is a sentiment (sub)context, and wherein determining a sentiment score of each constituent comprises:
determining a polarity distribution of each (sub)context, and
calculating an entity sentiment score for each entity from the cumulative polarity distributions $D_1 \ldots D_n$ across all (sub)contexts $z_1 \ldots z_n$, the entity sentiment score for polarity p of entity e in sentence s with n (sub)contexts being obtained through the equation:

$$e\_scr(p, e) = \sum_{i=1}^{n} fD_i$$

wherein
z is Constituent as sentiment (sub)context
p is Polarity p∈{POS, NTR, NEG} assigned to z, by sentiment grammar $D_i$ is Polarity distribution of $z_j := \begin{cases} f & \text{if } p \text{ is POS} \\ f & \text{if } p \text{ is NEG} \\ 0.5 \cdot f & \text{if } p \text{ is NTR} \end{cases}$ s is Sentence
d is Dijkstra's shortest path distance between sentence root and head of $z_i$
β is Coverage coefficient: length($z_i$)/length(s)
f is Weight $f$ or $z_i$:

$$\frac{\sqrt{d} + \beta}{\text{length}(s)};$$

a link determining module arranged to determine which constituents link the two entities;
a calculating module arranged to calculate an overall sentiment score for the sentiment between the two entities by processing the sentiment score of each constituent of the constituents determined to link the two entities; and
an outputting module arranged to output the overall sentiment score for the sentiment between the two entities discussed by the natural language contained in the electronic text.

9. A computer implemented method for analysing natural language contained in electronic text to determine a sentiment between two entities discussed in the natural language, comprising the following steps:
receiving, via an input module, the electronic text containing the natural language at a processing circuitry;
using an input/output subsystem of the processing circuitry to move the received natural language to a data storage;
analysing the natural language in the data storage to determine a syntactic representation which shows the syntactic constituents of the analysed natural language together with determining a sentiment score of each constituent, wherein each constituent is a sentiment (sub)context;
wherein the determining a sentiment score of each constituent comprises using a relation classifier to traverse a dependency path using a limited sliding window, each window position of which represents a (sub)context triple ($z_{i-1}, z_i, z_{i+1}$), and to determine a polarity distribution of each (sub)context;
determining which constituents link the two entities;
calculating an overall sentiment score for the sentiment between the two entities by processing the sentiment score of each constituent of the constituents determined to link the two entities, wherein calculating an overall sentiment score for the sentiment between the two entities comprises:
calculating the overall sentiment scores for the sentiment between the two entities from the cumulative polarity distributions $D_1 \ldots D_n$ across all (sub)contexts $z_1 \ldots z_n$, respectively, the cumulative scores for the three polarity counts (r.pos, r.ntr, r.neg) for sentiment r between the two entities ($e_1, e_2$) in sentence s with n (sub)contexts being obtained through the following equation:

$$r\_scr(r, e_1, e_2) = \sum_{i=1}^{n} fD_i$$

wherein
$z_i$ is Constituent as sentiment (sub)context
$t_i$ is Triple of previous current, and next (subcontext) along the path between $e_1$ and $e_2$: ($z_{i-1}, z_i, z_{i+1}$)
p is Polarity p∈{POS, NTR, NEG} assigned to t, by sentiment grammar D is Polarity distribution of $z_i :=$ $\begin{cases} r \cdot \text{pos} = \alpha, & r \cdot ntr = 1 - \alpha & \text{if } p \text{ is POS} \\ r \cdot \text{neg} = \alpha, & r \cdot ntr = 1 - \alpha & \text{if } p \text{ is NEG} \\ r \cdot ntr = \alpha & & \text{if } p \text{ is NTR} \end{cases}$ d is Dijkstra's shortest path distance between $e_1$ and $e_2$ heads $$\alpha \text{ is (Sub)context score} := \sqrt{\frac{1}{\log_2(d)}}.$$

outputting, by a computer processor, the overall sentiment score for the sentiment between the two entities discussed by the natural language contained in the electronic text.

10. A method according to claim 9 wherein the syntactic representation is a tree showing how the entities within the natural language are connected to one another.

11. A method according to claim 9 wherein the sentiment score for each constituent is determined from a sentiment score from the or each entity within the natural language.

12. A method according to claim 10, wherein the determination as to which constituents linking the two entities comprises performing a tree search to determine a shortest path.

13. A method according to claim 9, wherein processing the sentiment score of each constituent of the constituents determined to link the two entities includes using a windowed method to include a plurality of entities.

14. A method according to claim 13 wherein the windowed method includes using a set of rules to provide a score for the arrangement of entities within the window.

15. A non-transitory computer-readable medium storing executable computer program code for analysing natural language contained in electronic text to determine a sentiment between two entities discussed in the natural language, the computer program code executable to perform steps comprising:

receiving, via an input module, the electronic text containing the natural language at a processing circuitry;

using an input/output subsystem of the processing circuitry to move the received natural language to a data storage;

analysing the natural language in the data storage to determine a syntactic representation which shows the syntactic constituents of the analysed natural language together with determining a sentiment score of each constituent, wherein each constituent is a sentiment (sub)context, wherein the determining a sentiment score of each constituent comprises using a relation classifier to traverse a dependency path using a limited sliding window, each window position of which represents a (sub)context triple $(z_{i-1}, z_i, z_{i+1})$, and to determine a polarity distribution of each (sub)context;

determining which constituents link the two entities;

calculating an overall sentiment score for the sentiment between the two entities by processing the sentiment score of each constituent of the constituents determined to link the two entities, wherein the calculating an overall sentiment score for the sentiment between the two entities comprises:

calculating the overall sentiment scores for the sentiment between the two entities from the cumulative polarity distributions $D_1 \ldots D_n$ across all (sub)contexts $z_1 \ldots z_n$, respectively, the cumulative scores for the three polarity counts (r.pos, r.ntr, r.neg) for sentiment r between the two entities $(e_1, e_2)$ in sentence s with n (sub)contexts being obtained through the following equation:

$$r_{scr(r,e_1,e_2)} = \sum_{i=1}^{n} fD_i$$

wherein $z_i$ is Constituent as sentiment (sub)context $t_i$ is Triple of previous current, and next (subcontext) along the path between $e_i$ and $e_2$:

$(z_{i-1}, z_i, z_{i+1})$ p is Polarity p∈{POS, NTR, NEG} assigned to $t_i$ by sentiment grammar $D$ is Polarity distribution of $z_i :=$ $$\begin{cases} r \cdot pos = \alpha, & r \cdot ntr = 1 - \alpha & \text{if } p \text{ is POS} \\ r \cdot neg = \alpha, & r \cdot ntr = 1 - \alpha & \text{if } p \text{ is NEG} \\ r \cdot ntr = \alpha & & \text{if } p \text{ is NTR} \end{cases}$$

d is Dijkstra's shortest path distance between $e_1$ and $e_2$ heads $$\alpha \text{ is (Sub)context score} := \sqrt{\frac{1}{\log_2(d)}}.$$

outputting the overall sentiment score for the sentiment between the two entities discussed by the natural language contained in the electronic text.

* * * * *